(12) United States Patent
Lee

(10) Patent No.: US 8,035,940 B2
(45) Date of Patent: Oct. 11, 2011

(54) OVER-VOLTAGE PROTECTION CIRCUIT STRUCTURE AND METHOD THEREOF

(75) Inventor: Wen-Chang Lee, Taoyuan Hsien (TW)

(73) Assignee: Delta Electronics, Inc., Taoyuan Hsein (TW)

( * ) Notice: Subject to any disclaimer, the term of this patent is extended or adjusted under 35 U.S.C. 154(b) by 312 days.

(21) Appl. No.: 12/126,089

(22) Filed: May 23, 2008

(65) Prior Publication Data

US 2009/0180229 A1 Jul. 16, 2009

(30) Foreign Application Priority Data

Jan. 10, 2008 (TW) ................................ 97100963 A

(51) Int. Cl.
*H02H 3/20* (2006.01)
*H02H 9/04* (2006.01)
*H02H 3/00* (2006.01)
*H02H 9/08* (2006.01)

(52) U.S. Cl. ........................................ 361/91.1; 361/42
(58) Field of Classification Search .................. 361/91.1, 361/42
See application file for complete search history.

(56) References Cited

U.S. PATENT DOCUMENTS 7,489,120 B2 * 2/2009 Matthews ...................... 323/284
2008/0247105 A1 * 10/2008 Divan .............................. 361/56

FOREIGN PATENT DOCUMENTS

CN 1728490 2/2006

OTHER PUBLICATIONS

Chinese Office Action dated Jul. 12, 2010 (6 pages).

* cited by examiner

*Primary Examiner* — Jared Fureman
*Assistant Examiner* — Lucy Thomas
(74) *Attorney, Agent, or Firm* — Holland & Knight LLP; Brian J. Colandreo, Esq.; Jeffrey T. Placker

(57) ABSTRACT

An over-voltage protection circuit structure for protecting a high power translation circuit is provided. The over-voltage protection circuit structure receives an alternating current input and comprises a relay circuit, a voltage detection module, and an energy supply circuit. The relay circuit relays the alternating current input to the high power translation circuit. The energy supply circuit provides power to the voltage detection module in response to the alternating current input. The voltage detection module detects a voltage value of the alternating current input continuously. When the voltage value is greater than or equal to a first reference value, the voltage detection module generates an over-voltage signal. The relay circuit opens to cease delivering the alternating current input into the high power circuit in response to the over-voltage signal, thus the purpose of protecting the high power circuit is achieved.

25 Claims, 27 Drawing Sheets

OVER-VOLTAGE PROTECTION CIRCUIT STRUCTURE AND METHOD THEREOF

RELATED APPLICATION

This application claims priority to Taiwan Patent Application No. 097100963 filed on 10 Jan. 2008, the contents of which are incorporated herein by reference in their entirety.

BACKGROUND OF THE INVENTION

1. Field of the Invention

The present invention relates to a protection circuit. More specifically, the present invention relates to a protection circuit capable of preventing damage from the over-voltage.

2. Descriptions of the Related Art

Referring to FIG. 1, a conventional over-voltage protection circuit structure 1 for protecting a high power translation circuit is illustrated. The over-voltage protection circuit structure 1 comprises a voltage detection module 110 and a relay circuit 134. The relay circuit 134 comprises a switch 116 and an inrush resistor 117 connected in parallel with the switch 116. The high power translation circuit comprises a power correction module 111, a direct current to direct current (DC/DC) module 112 and an auxiliary power supply 113. The power correction module 111, the DC/DC module 112 and the auxiliary power supply 113 are all well-known to those skilled in the art, and therefore no further description thereof will be made herein. The voltage detection module 110 is configured to detect a voltage across alternating current (AC) terminals 114 and 115. When the voltage go excessively high, the voltage detection module 110 merely opens the switch 116, with the AC voltage still passing through the inrush resistor 117 and a bridge rectifier 118 into the circuit continuously. When the AC voltage reaches a certain value, breakdown usually occurs in such elements as lightning arresters, power transistors and capacitors, thus causing damage to the circuit.

FIG. 2 illustrates a conventional way to make improvement on this shortcoming, which is a conventional over-voltage protection circuit structure 2. The over-voltage protection circuit structure 2 differs from the over-voltage protection circuit structure 1 in that, in the relay circuit 234, an auxiliary switch 220 is connected in series with the inrush resistor 117, both of which are then connected in parallel with the original switch 116. Once an AC over-voltage occurs, the voltage detection module 110 quickly opens the auxiliary switch 220 and the switch 116 in sequence, thus preventing the AC voltage from being delivered into the circuit. Additionally, a bulk capacitor 119 is configured to supply energy to the auxiliary power supply 113, which in turn supplies power to the power detection module 110. The power detection module 110 also detects a voltage across the bulk capacitor 110, and once this voltage drops smaller than a certain preset recovering value, the power detection module 110 closes the auxiliary switch 220 and the switch 116 in sequence, so that the AC voltage of the circuit recovers through the auxiliary switch 220 and the switch 116. If the AC voltage stays excessively high continuously, the voltage detection module 110 quickly opens the auxiliary switch 220 and the switch 116 in sequence again to prevent from that the AC over-voltage is delivered into the circuit. Once again, the bulk capacitor 119 supplies energy to the auxiliary power supply 113, i.e., the bulk capacitor 119 begins to discharge. Therefore, when the AC voltage stays high continuously, the auxiliary switch 220 and the switch 116 are opened at first, and then closed after the bulk capacitor 119 is discharged for a time of period, and again opened immediately upon detection of an over-voltage. This operating cycle is repeated over and over again according to the aforesaid voltage status.

Unfortunately, after long periods of opening and closing operations, carbon deposition tends to occur on contacts of the auxiliary switch 220 and the switch 116, causing failure to open after the switches are closed. As a consequence, the entire circuit will fail to work and the AC over-voltage is delivered continuously into the circuit to cause disruption. Furthermore, such a circuit cannot actively detect an AC voltage on a continuous basis; rather, the voltage detection module 110 cannot continue to determine occurrence of an AC over-voltage until the auxiliary switch 220 and the switch 116 are closed to allow delivery of the AC voltage into the circuit.

In summary, efforts still have to be made in the art to ensure that the voltage detection module 110 can still detect and determine an over-voltage continuously while the auxiliary switch 220 and the switch 116 are opened, so as to reduce frequency to open and close the auxiliary switch 220 and the switch 116. This helps to prevent failure of the auxiliary switch 220 and the switch 116, and maintain a voltage of the bulk capacitor within a reasonable and safe range, thus accomplishing the goal of protecting the overall circuit.

SUMMARY OF THE INVENTION

One objective of this invention is to provide a protection circuit for protecting a high power translation circuit. The protection circuit receives an alternating current input and comprises a relay circuit, a voltage detection module and an energy supply circuit. The relay circuit is coupled to the high power translation circuit and configured to relay the alternating current input to the high power translation circuit. The voltage detection module is coupled to the relay circuit to receive the alternating current input, and is configured to continuously detect a voltage value corresponding to the alternating current input, so as to generate an over-voltage signal when the voltage value is greater than or equal to a first reference value. The relay circuit is configured to be opened to cease delivering the alternating current input into the high power translation circuit in response to the over-voltage signal. The energy supply circuit is coupled to the relay circuit and the voltage detection module, and is configured to supply a power to the voltage detection module in response to the alternating current input, so that the voltage detection module operates normally.

Another objective of this invention is to provide a protection circuit for protecting a high power translation circuit. The high power translation circuit comprises a rectification circuit. The protection circuit receives an alternating current input and comprises a relay circuit, a voltage detection module and an energy supply circuit. The relay circuit is coupled to an output of the rectification circuit and configured to relay the alternating current input to the high power translation circuit. The voltage detection module is coupled to the high power translation circuit to receive the alternating current input, and is configured to continuously detect a voltage value corresponding to the alternating current input, so as to generate an over-voltage signal when the voltage value is greater than or equal to a first reference value. The relay circuit is configured to be opened to cease delivering the alternating current input into the high power translation circuit in response to the over-voltage signal. The energy supply circuit is coupled to the relay circuit and the voltage detection module, and is configured to supply a power to the voltage detection module in response to the alternating current input, so that the voltage detection module operates normally.

The protection circuit of this invention, which is configured to protect a high power translation circuit, employs a voltage detection module to continuously detect and determine an over-voltage condition of an AC input. In case an over-voltage occurs in the AC input, the protection circuit opens the relay circuit to cease delivering the over-voltage into the high power translation circuit, thereby to obviate damage caused by the over-voltage to the high power translation circuit. Furthermore, as the voltage detection module continuously detects and determines an over-voltage condition of the AC input, frequency to open and close the switches in the circuit is effectively reduced, thus overcoming the shortcoming of the prior art solutions.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Embodiments will be described hereinbelow to explain this invention, which relates to a protection circuit for protecting a high power translation circuit. According to this invention, a voltage detection module is configured to continuously detect and determine an over-voltage condition of an AC input. In case an over-voltage occurs in the AC input, the protection circuit opens a relay circuit to cease delivering the over-voltage into the high power translation circuit, thereby to obviate damage caused by the over-voltage to the high power translation circuit. Furthermore, as the voltage detection module continuously detects and determines an over-voltage condition of the AC input, the frequency to open and close the switch elements in the circuit is effectively reduced, thus accomplishing the goal of protecting the high power translation circuit. However, these embodiments are not intended to limit that this invention can only be embodied in any specific context, applications or with particular methods described in these embodiments. Therefore, description of these embodiments is only intended to illustrate rather than to limit this invention. It should be noted that, in the following embodiments and attached drawings, elements not directly related to this invention are omitted from illustration, and dimensional relationships among individual elements are illustrated only for ease of understanding, rather that to limit actual scale thereto.

Figure 1:
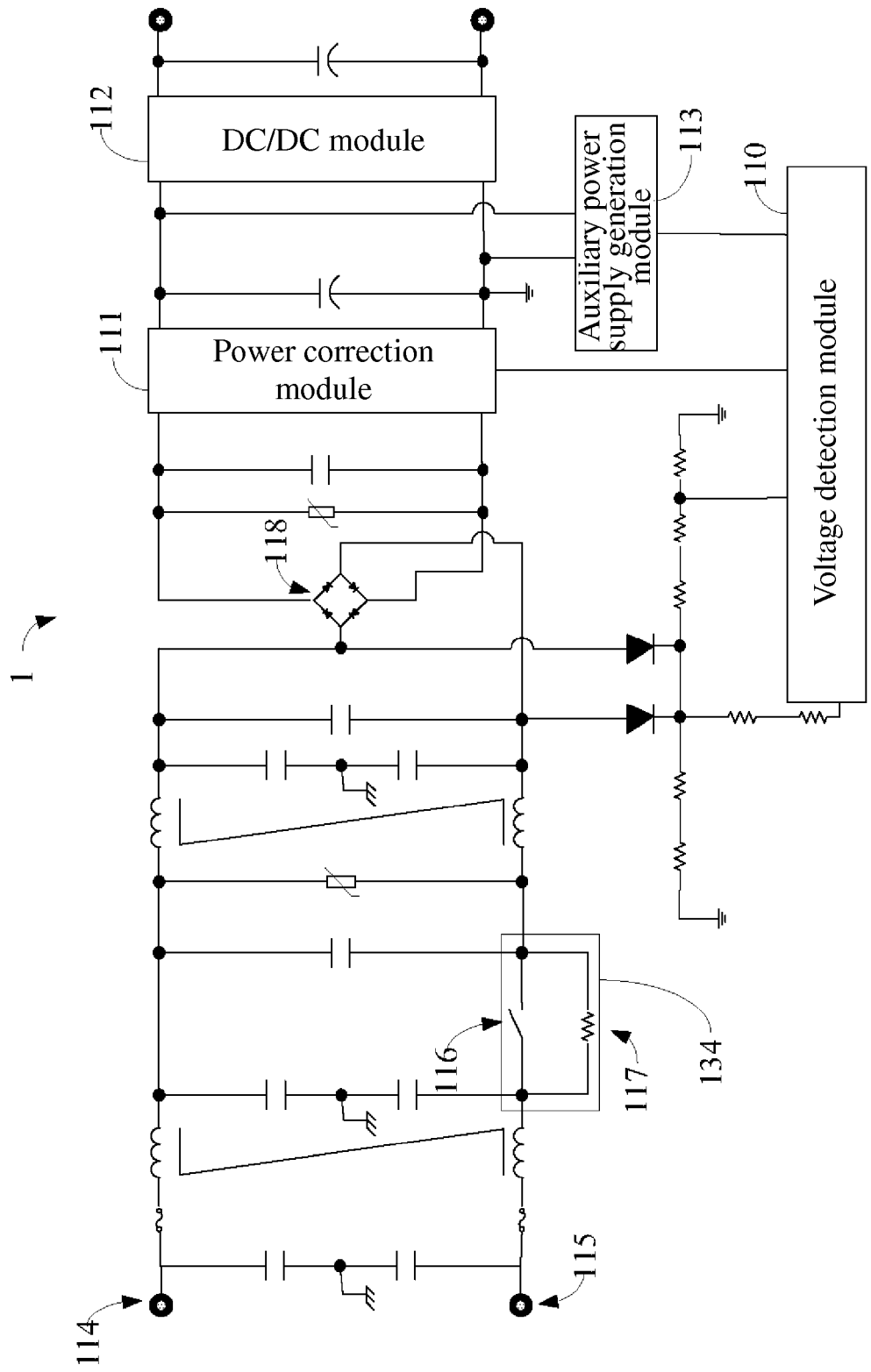
FIG. 1 is a circuit diagram of a conventional over-voltage protection circuit structure.
Figure 2:
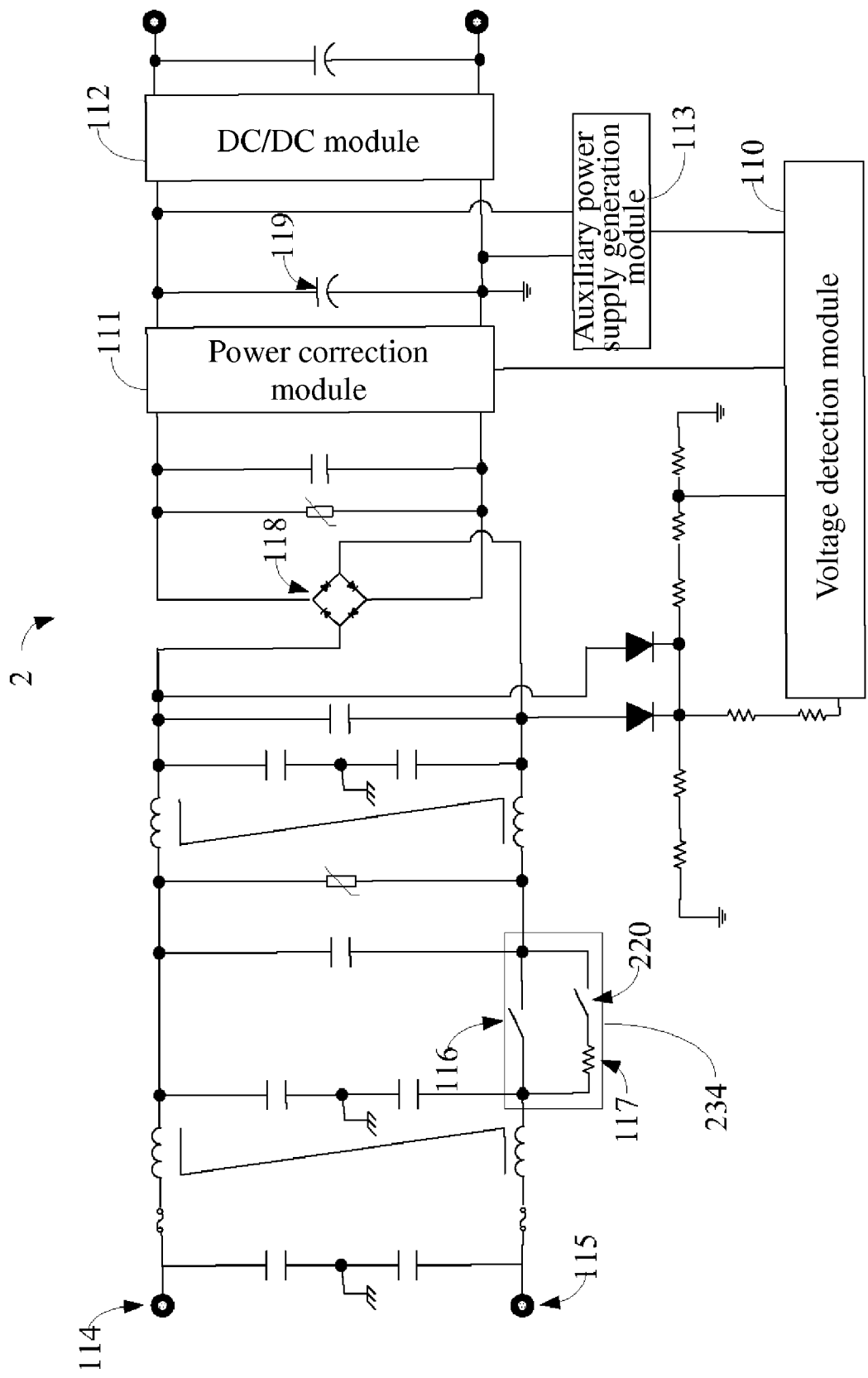
FIG. 2 is a circuit diagram of another conventional over-voltage protection circuit structure.
Figure 3:
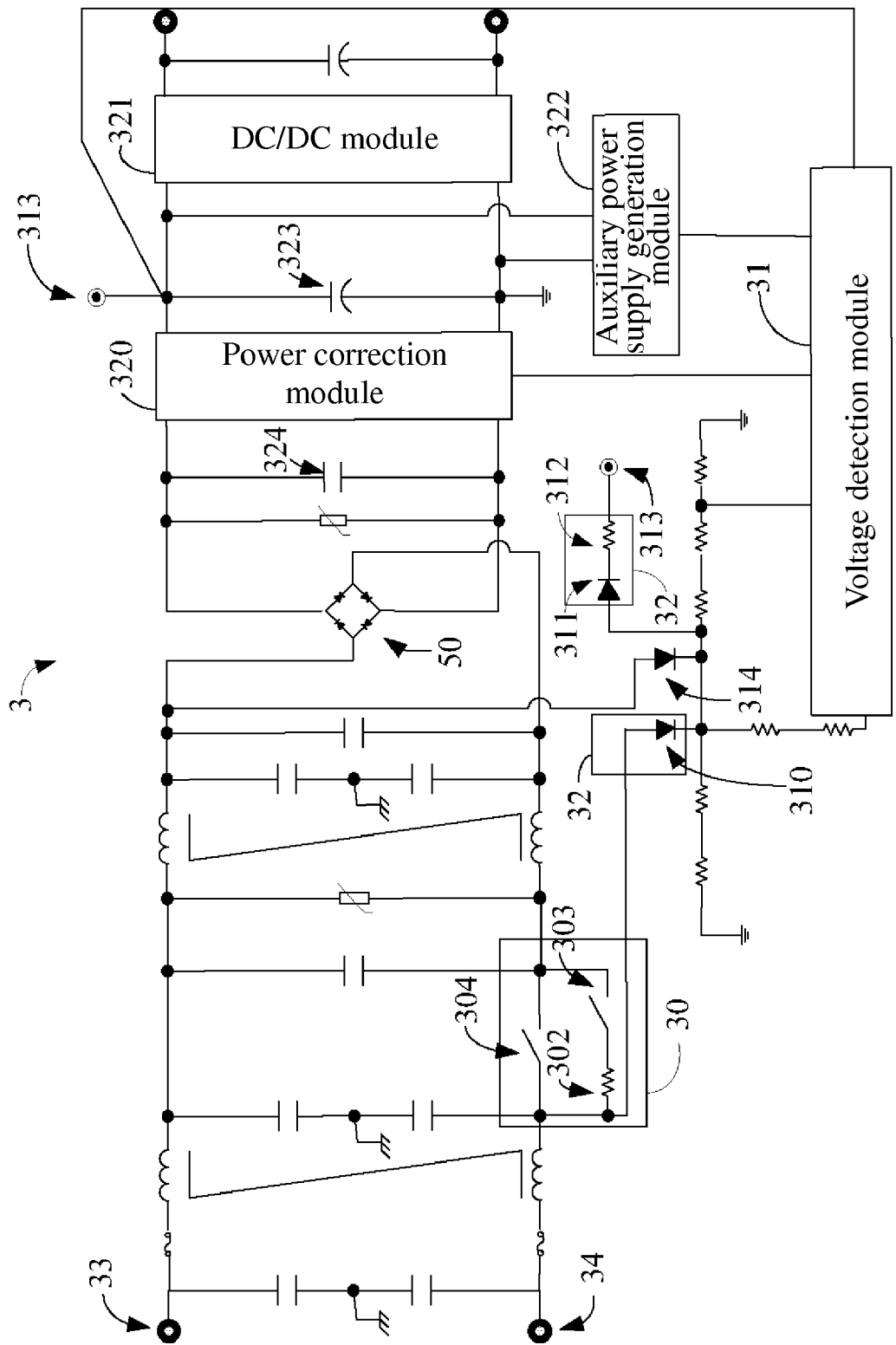
FIG. 3 is a circuit diagram of a first preferred embodiment of this invention.

As illustrated in FIG. 3, a first preferred embodiment of this invention is a protection circuit 3 for protecting a high power translation circuit. The protection circuit 3 comprises a relay circuit 30, a voltage detection module 31 and an energy supply circuit 32. The relay circuit 30, which is coupled to the high power translation circuit, receives an AC input and is configured to relay the AC input to the high power translation circuit. The voltage detection module 31, which is coupled to a front end of the relay circuit 30 and an input terminal of the high power translation circuit, receives the AC input and is configured to continuously detect a voltage value of the AC input. In case the voltage value is greater than or equal to a first reference value, the voltage detection module 31 generates an over-voltage signal. In response to this over-voltage signal, the relay circuit 30 is opened to cease delivering the AC input into the high power translation circuit, thereby to prevent damage otherwise caused by the AC over-voltage to elements of the high power translation circuit. The energy supply circuit 32, which is coupled to the relay circuit 30 and the voltage detection module 31, is configured to supply a power to an auxiliary power supply generation module 322 in response to the AC input to power the voltage detection module 31, so that the voltage detection module 31 operates normally.

Additionally, the voltage detection module 31 is further configured to continuously detect a voltage value corresponding to the AC input when the relay circuit 30 is opened, and generate a recovering signal once the voltage value drops below a second reference value. In response to the recovering signal, the relay circuit 30 is closed once again to relay the AC input to the high power translation circuit.

In order for the voltage detection module 31 to continuously detect the voltage of the AC input, a bulk capacitor 323 supplies an energy to the auxiliary power supply generation module 322, which in turn supplies an auxiliary power supply to the voltage detection module 31 to ensure normal operation thereof. When the AC input voltage is smaller than the second reference value, an energy is supplied via a first switch element 303 and a second switch element 304 to charge the bulk capacitor 323; and when the relay circuit is opened, the bulk capacitor 323 can be charged via the energy supply circuit.

Particularly, the protection circuit 3 receives the AC input via AC input terminals 33 and 34. The relay circuit 30 comprises a first impedance element 302, a first switch element 303 and a second switch element 304. The energy supply circuit 32 comprises a first switching device 310, switching device 311, a second impedance element 312 and a voltage terminal 313. The relay circuit 30 receives the AC input from the AC input terminals 33 and 34. The first switch element 303 and the first impedance element 302 are jointly connected in series, and the second switch element 304 is connected to the first switch element 303 and the first impedance element 302 respectively, so as to be connected in parallel with the series connection formed by the first switch element 303 and the first impedance element 302. The second switch element 304 and the first impedance element 302 are coupled to the voltage detection module 31.

Specifically, to detect the voltage of the AC input, the voltage detection module 31 is coupled to the first impedance element 302, the second switch element 304 and the AC input terminal 34 via a positive terminal of the first switching device 310, and coupled to the AC input terminal 33 via the second switching device 314. In this embodiment, the first switching device 310 is a diode. In other embodiments, the first switching device 310 may be other transistors featuring a turn-on voltage, such as a Metal-Oxide-Semiconductor Field Effect Transistor (MOSFET). Additionally, when the relay circuit 30 is opened in response to the over-voltage signal, the first switching device 310 is coupled to the switching device 311 and the second impedance element 312 to supply the AC input to the voltage terminal 313, so that the bulk capacitor 323 is charged by the voltage terminal 313. Consequently, the bulk capacitor 323 is adapted to supply energy to the auxiliary power supply generation module 322 which, as a result, is in turn adapted to supply a power supply to the voltage detection module 31 to ensure normal operation thereof. Particularly, if the second impedance element 312 is selected with appropriate impedance, the energy charged into the bulk capacitor 323 will be equal to that consumed by the auxiliary power supply generation module. As a result, the voltage across the bulk capacitor 323 drops gradually to stabilize at a reasonable and safe voltage value. Such a stable voltage value is dominated by the following three items: (1) an AC voltage value when the aforesaid voltage is stabilized); (2) power consumption of the auxiliary power supply generation module 322; and (3) impedance of the second impedance element 312. During normal operation, the power correction module outputs a voltage (e.g., 400V) to the voltage terminal 313. If a bulk capacitor 323 of an adequate capacitance is provided, the voltage at the voltage terminal 313 may be considered as a DC voltage, and the following equation is then obtained (turn-on voltage drops across the switching device 311 and diodes in the bridge rectifier are ignored):

$$Po \times R1 = Vbus \cdot \left[ \frac{Vm}{\pi} \sqrt{1 - \left(\frac{Vbus}{Vm}\right)^2} + Vbus \cdot \left( \frac{\arcsin\left(\frac{Vbus}{Vm}\right)}{\pi} - \frac{1}{2} \right) \right] \quad (1)$$

wherein

Vm: a peak voltage of the AC input;

Po: power consumption of the auxiliary power supply generation module;

R1: impedance of the second impedance element 312;

Vbus: a voltage across the bulk capacitor 323 (i.e., a voltage at the voltage terminal 313).

For example, assuming that the first reference value is an AC voltage of 320V, the voltage detection module 31 will generate an over-voltage signal when the AC input voltage is greater than or equal to 320V, in order to open the first switch element 303 and the second switch element 304 in sequence. Assume that in this case the auxiliary power supply module 322 has a power consumption of about 3 W, the second impedance element 312 has an impedance value of 2.5 kΩ, and the bulk capacitor 323 finally stabilizes at a voltage of 310V which is much smaller than the peak AC voltage of 320 √2. Therefore, when the relay circuit is opened and power consumption of the auxiliary power supply module is determined, voltage of the bulk capacitor 323 at a selected impedance of the second impedance element 312 will reflect the voltage of the AC input. Accordingly, the voltage of the bulk capacitor 323 may also be detected, and a recovering signal is generated once this voltage is smaller than a second reference value. It should be noted that, the aforesaid sequence in which the switches are opened or closed is associated with turn-on voltages thereof, and is not intended to limit this invention. In other embodiments, this sequence may vary depending on actual conditions. In this embodiment, each of the switching device 311, the first switching device 310 and a second switching device 314 is a diode. In other embodiments, these switching devices may also be transistors connected in the same direction or other elements providing directional functions.

As described above, the voltage detection module 31 may detect the voltage of the AC input before it is delivered to the first impedance element 302 and the second switch element 304. Once the voltage detection module 31 detects that the voltage of the AC input is greater than or equal to a first reference value, the voltage detection module 31 generates an over-voltage signal, which is transmitted to the relay circuit 30 to open the first switch element 303 and the second switch element 304 in sequence, so that the relay circuit 30 is opened in response to the over-voltage signal to cease delivering the AC input to the high power translation circuit, thus preventing damage otherwise caused by the over-voltage to electronic elements of the high power translation circuit.

When detecting that the voltage of the AC input is smaller than the second reference value, the voltage detection module 31 generates a recovering signal, which is transmitted to the relay circuit 30 to close the first switch element 303 and the second switch element 304 in sequence. As a result, the relay circuit 30 is closed to relay the AC input to the high power translation circuit. Additionally, apart from detecting that a voltage of the AC input is smaller than a second reference value, the voltage detection module 31 in this embodiment is further configured to detect a voltage across the bulk capacitor 323 when the relay circuit 30 is opened, and generate a recovering signal when this voltage is smaller than a second reference value. In response to the recovering signal, the relay circuit 30 is closed once again to relay the AC input to the high power translation circuit. Additionally, the power correction module 320 and the DC/DC module 321 shown in FIG. 3 are well known to those skilled in the art, and therefore no further description is made herein.

With the above configurations, the protection circuit of this invention is capable of continuously detecting a voltage of the AC input before it is delivered to the switch elements, thereby to prevent damage otherwise caused by an over-voltage to electronic elements of the high power translation circuit. On the other hand, opening and closing operations of the switch elements impose no influence on detection of the AC input voltage. In other words, the protection circuit is able to actively detect a voltage of the AC input on a continuous basis, which may reduce frequency to open and close the switch elements and prolong service life thereof, thus lessening probability of failure of the protection circuit.

Figure 4:
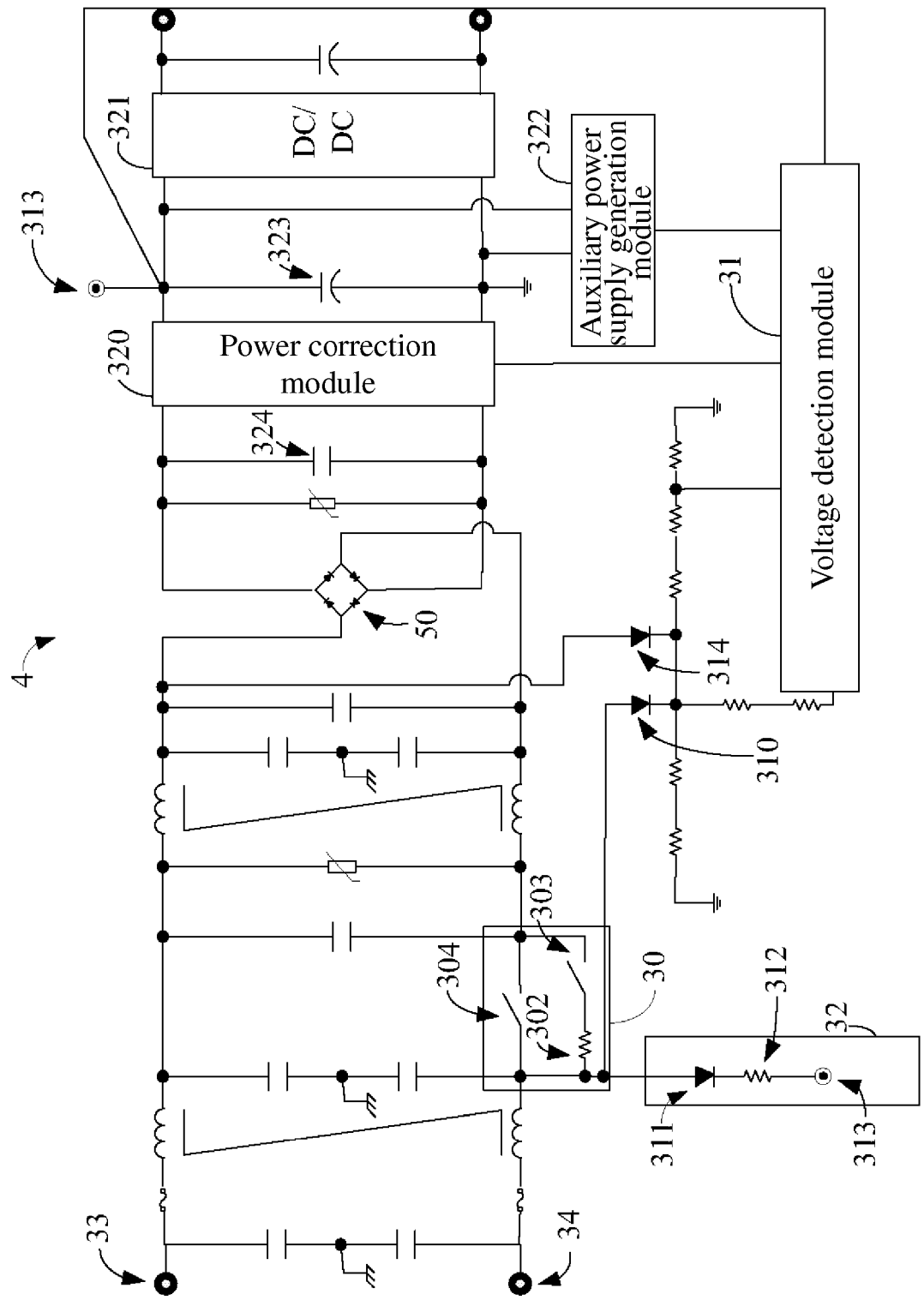
FIG. 4 is a circuit diagram of a second preferred embodiment of this invention.

As illustrated in FIG. 4, a second preferred embodiment of this invention is a protection circuit 4 for protecting a high power translation circuit. In the following description, only differences from the protection circuit 3 will be described, and the portions of the protection circuit 4 identical with those of the protection circuit 3 are omitted from description herein.

In this embodiment, the energy supply circuit 32 includes only the switching device 311 and the second impedance element 312 jointly connected in series. The switching device 311 has a positive terminal coupled to the first impedance element 302 and the second switch element 304 respectively, and is connected in series with the second impedance element 312 to the voltage terminal 313. With a turn-on voltage of the switching device 311 being ignored, the protection circuit 4 provides the same protection function as the protection circuit 3.

Figure 5:
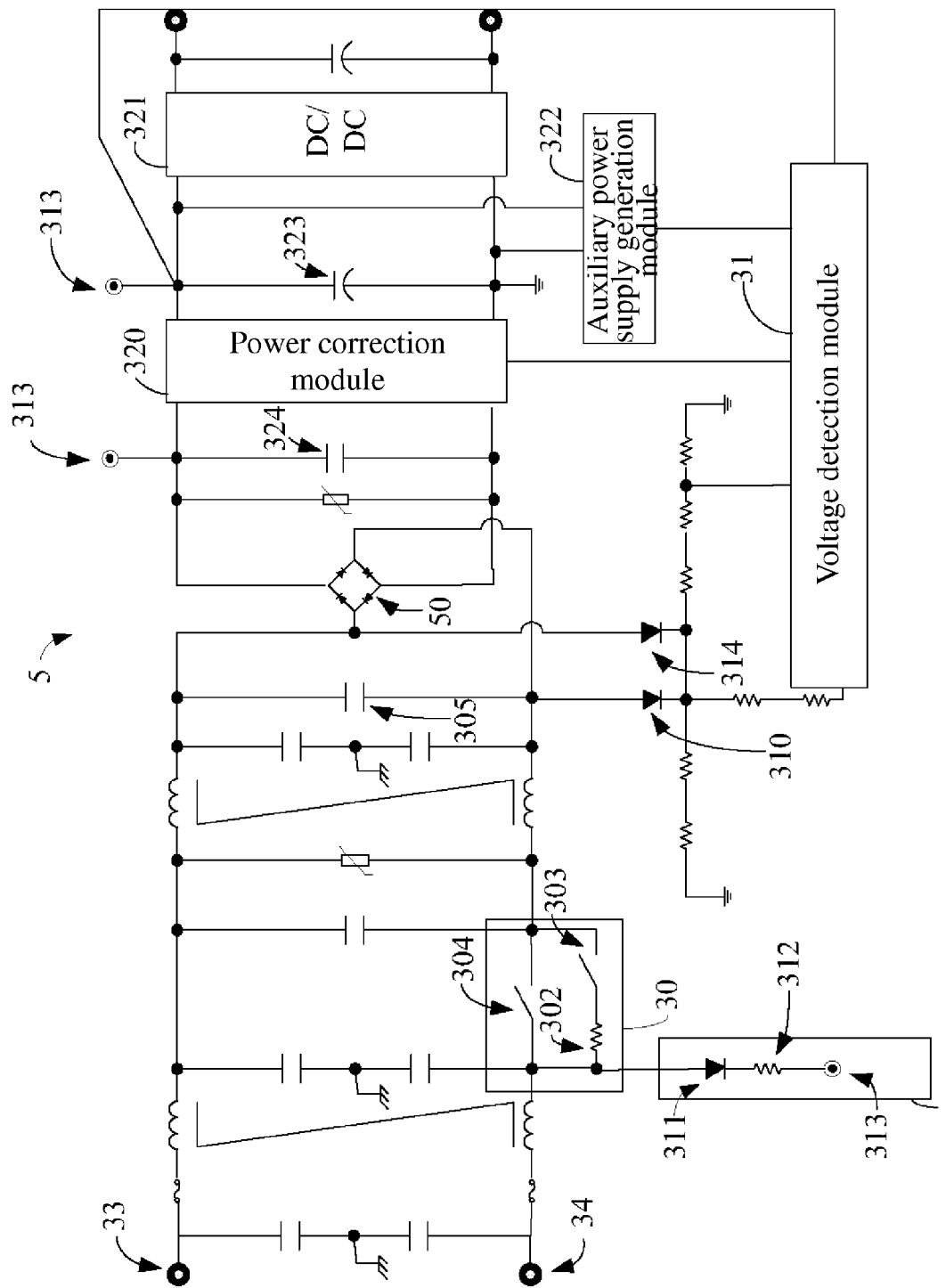
FIG. 5 is a circuit diagram of a third preferred embodiment of this invention.

As illustrated in FIG. 5, a third preferred embodiment of this invention is a protection circuit 5 for protecting a high power translation circuit. In the following description, only differences from the protection circuit 4 will be described, and the portions of the protection circuit 5 identical with those of the protection circuit 4 are omitted from description herein. In the protection circuit 5, the first switching device 310 has a positive terminal coupled to the capacitor (i.e., a capacitive impedance) 305 disposed at a back end of the relay circuit 30. Once the voltage detection module 31 detects that a voltage of the AC input is greater than or equal to the first reference value, the relay circuit 30 is opened in response to an over-voltage signal to cease delivering the AC input into the high power translation circuit. At this point, the voltage detection module 31 fails to continue detecting the AC voltage signal, but can still charge the bulk capacitor 323 via the voltage terminal 313 through a path of the energy supply circuit 32, so that the bulk capacitor 323 stabilizes at a reasonable and safe voltage value. Then the voltage detection module 31 determines a voltage of the AC input by the finally stabilized voltage of the bulk capacitor 323 (by means of the formula listed above). The voltage terminal 313 may be any positive power terminals disposed between the rectification circuit 50 and the capacitor 323, for example, a positive terminal of the capacitor 323 or a positive terminal of the capacitor 324 located before the power correction module 320. In other embodiments, the voltage terminal 313 may also be other similarly provisions. As readily appreciated by those skilled in the art, this circuit layout provides the same functions as the protection circuit 4, and thus no further description will be made herein.

Figure 6:
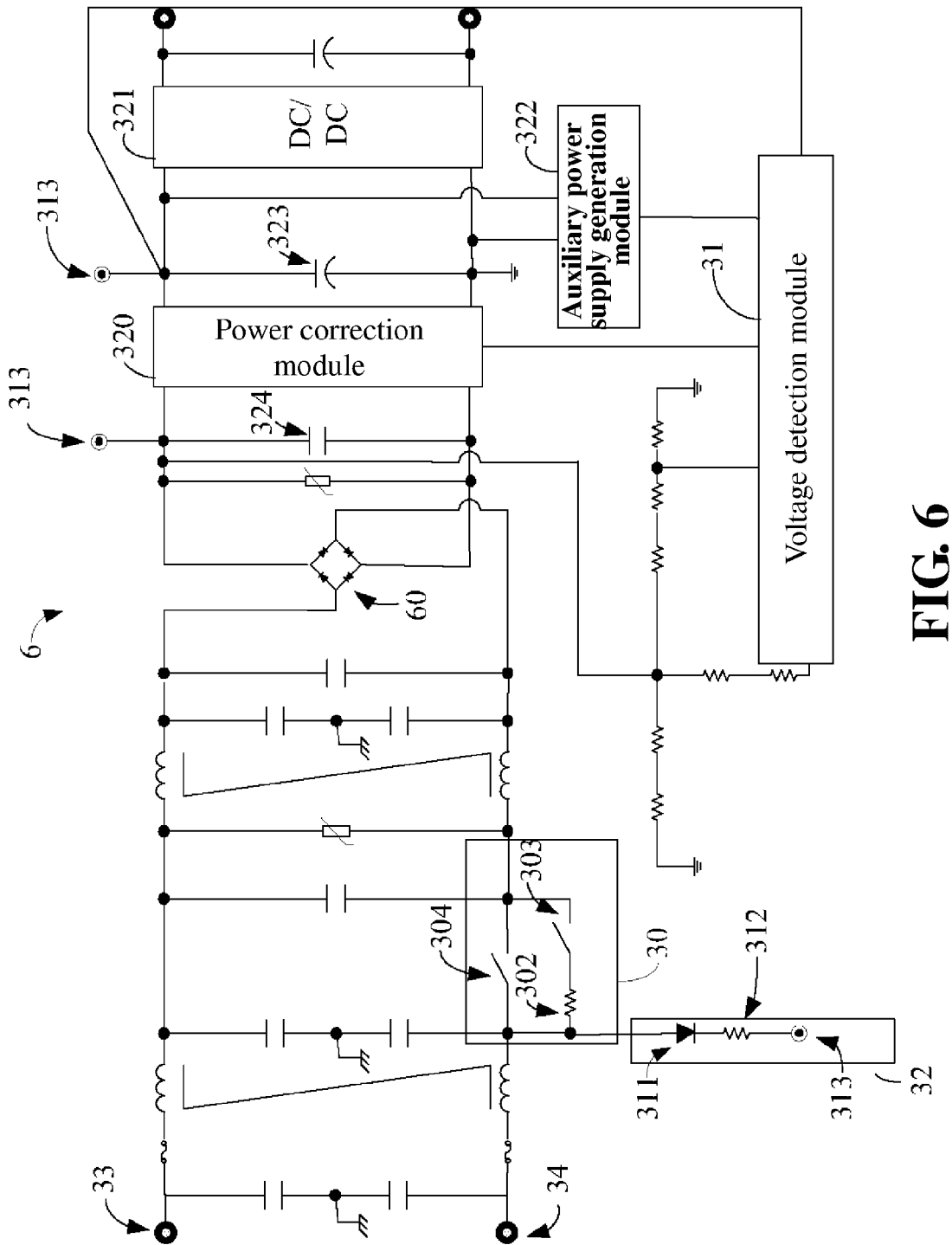
FIG. 6 is a circuit diagram of a fourth preferred embodiment of this invention.

As illustrated in FIG. 6, a fourth preferred embodiment of this invention is a protection circuit 6 for protecting a high power translation circuit. In the following description, only differences from the protection circuit 5 of the previous embodiment will be described, and the portions of the protection circuit 6 identical with those of the protection circuit 5 are omitted from description herein.

To minimize the use of electronic elements in the protection circuit 6, the voltage detection module 31 may be coupled behind the rectification circuit 60. As compared with previous embodiments, at least the first switching device 310 and the second switching device 314 are eliminated in the protection circuit 6. As readily appreciated by those skilled in the art, this circuit layout provides the same functions as the protection circuit 5, and thus no further description will be made herein.

Figure 7:
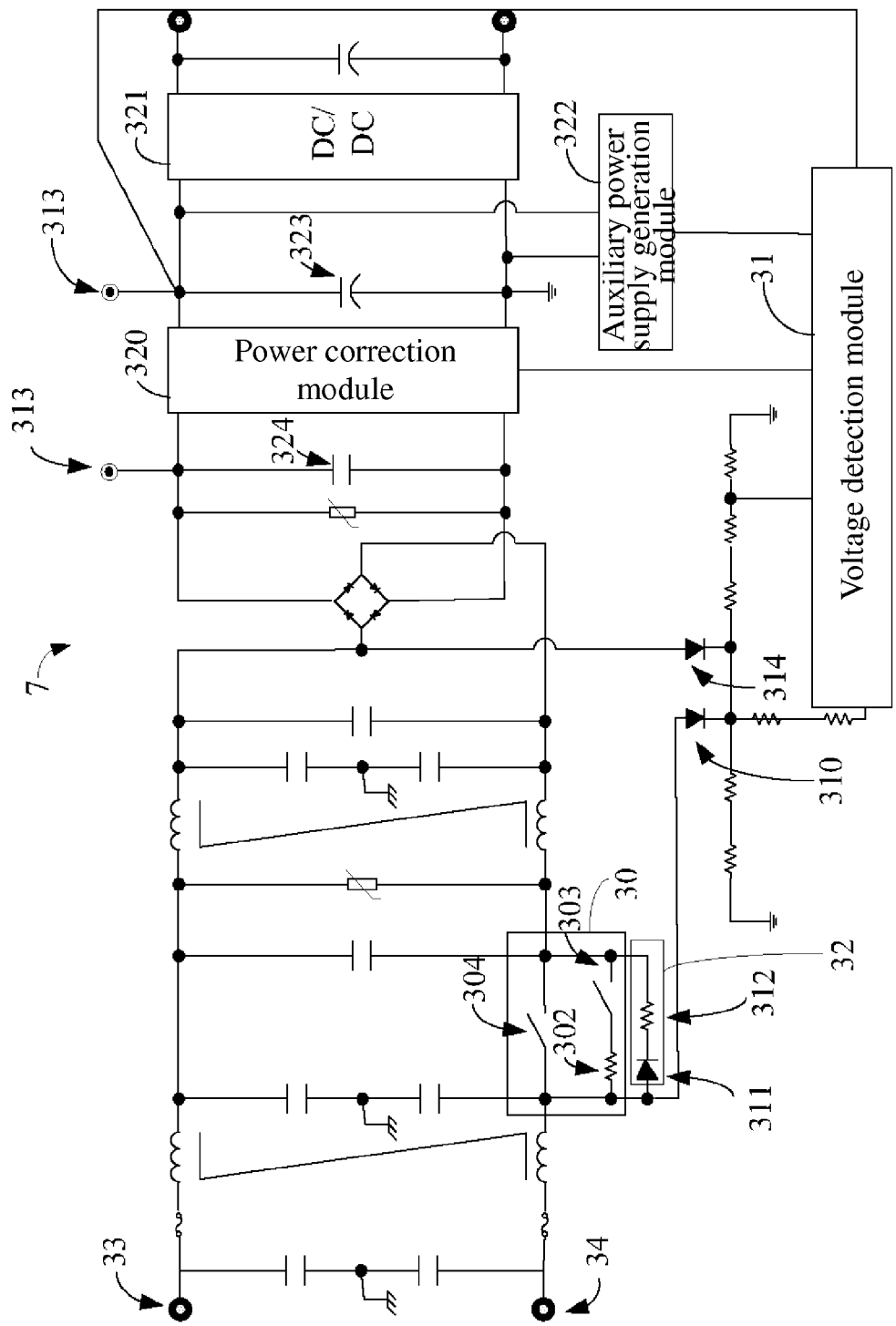
FIG. 7 is a circuit diagram of a fifth preferred embodiment of this invention.
Figure 8:
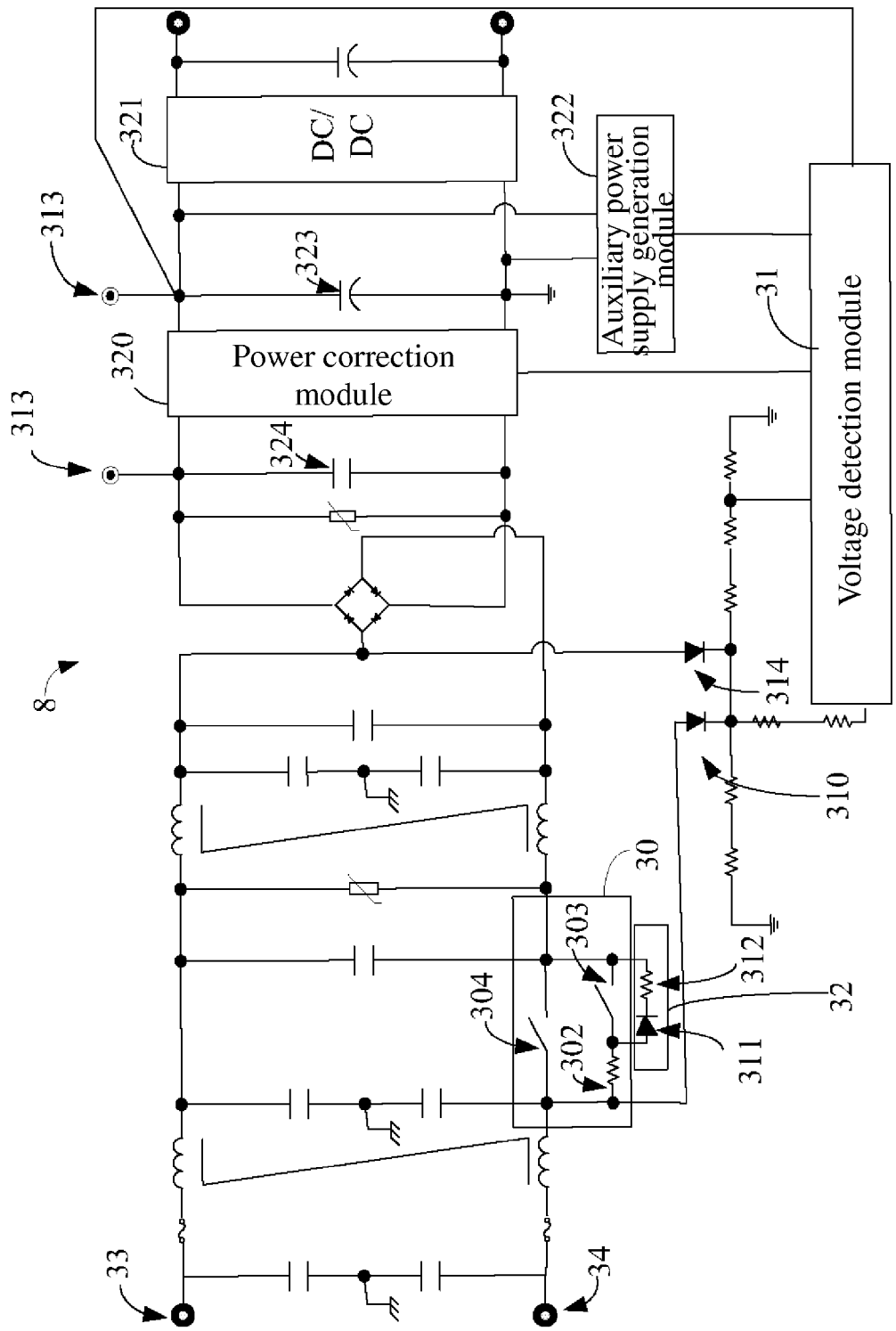
FIG. 8 is another circuit diagram of the fifth preferred embodiment of this invention.

As illustrated in FIGS. 7 and 8, a fifth preferred embodiment of this invention is protection circuits 7 and 8 for protecting a high power translation circuit. In the following description, only differences from the protection circuit 4 of the previous embodiment will be described, and the portions of the protection circuits 7 and 8 identical with those of the protection circuit 4 are omitted from description herein.

In the protection circuit 7, the energy supply circuit 32 includes the switching device 311 and the second impedance element 312 jointly connected in series. The relay circuit 30 is connected to the switching device 311 and the second impedance element 312 respectively to be connected in parallel with a series connection formed by the switching device 311 and the second impedance element 312. In the protection circuit 8, the first switching device 303 is connected to the switching device 311 and the second impedance element 312 respectively to be connected in parallel therewith. As readily appreciated by those skilled in the art, this circuit layout provides the same functions as the protection circuit 4, and thus no further description will be made herein.

Figure 9:
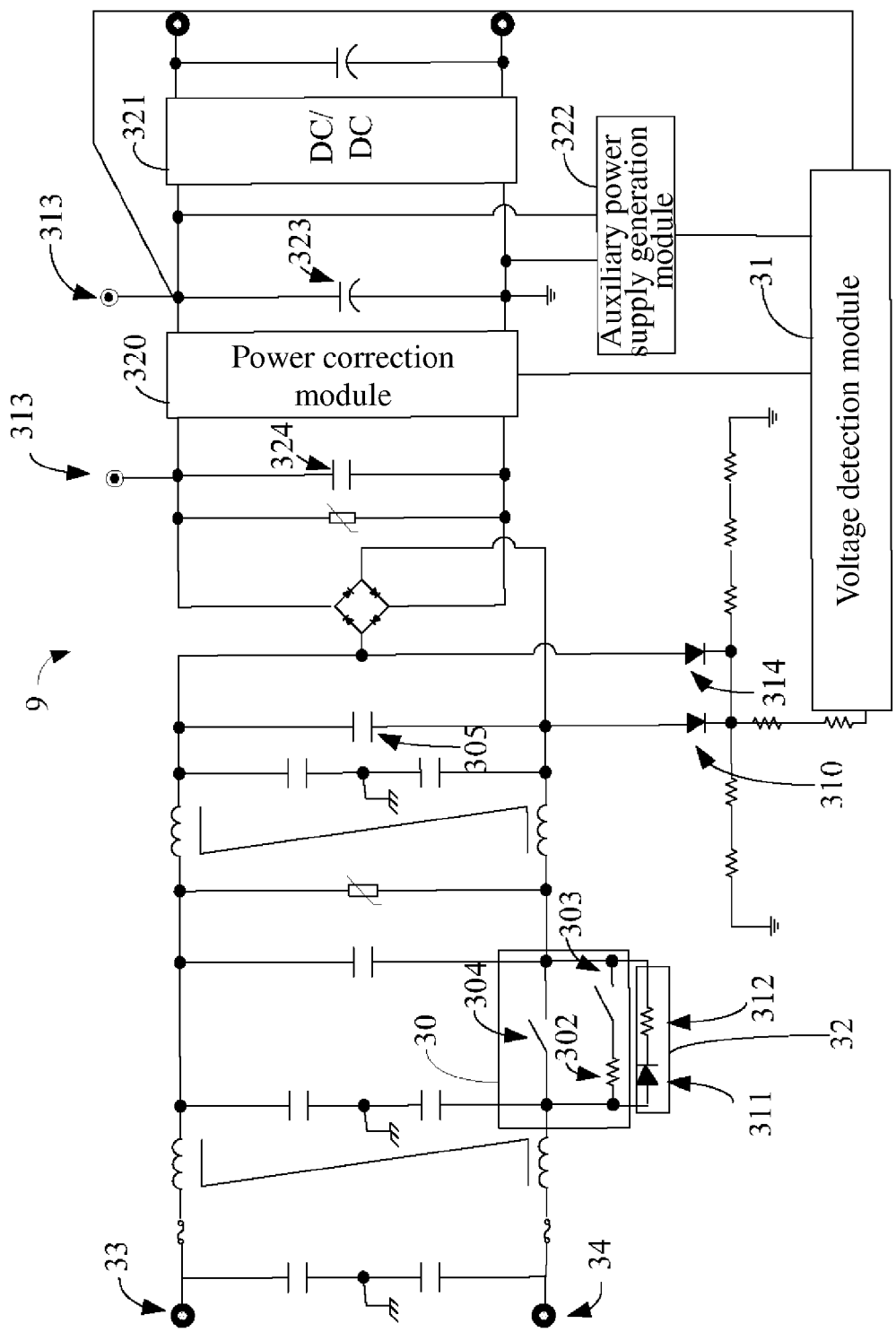
FIG. 9 is a circuit diagram of a sixth preferred embodiment of this invention.

As illustrated in FIG. 9, a sixth preferred embodiment of this invention is protection circuits 9 for protecting a high power translation circuit. The protection circuit 9 is substantially the same as the protection circuit 7 of the previous embodiment except that the first switching device 310 in this embodiment is coupled to the capacitor 305. As readily appreciated by those skilled in the art, this circuit layout provides the same functions as the protection circuit 7, and thus no further description will be made herein.

Figure 10:
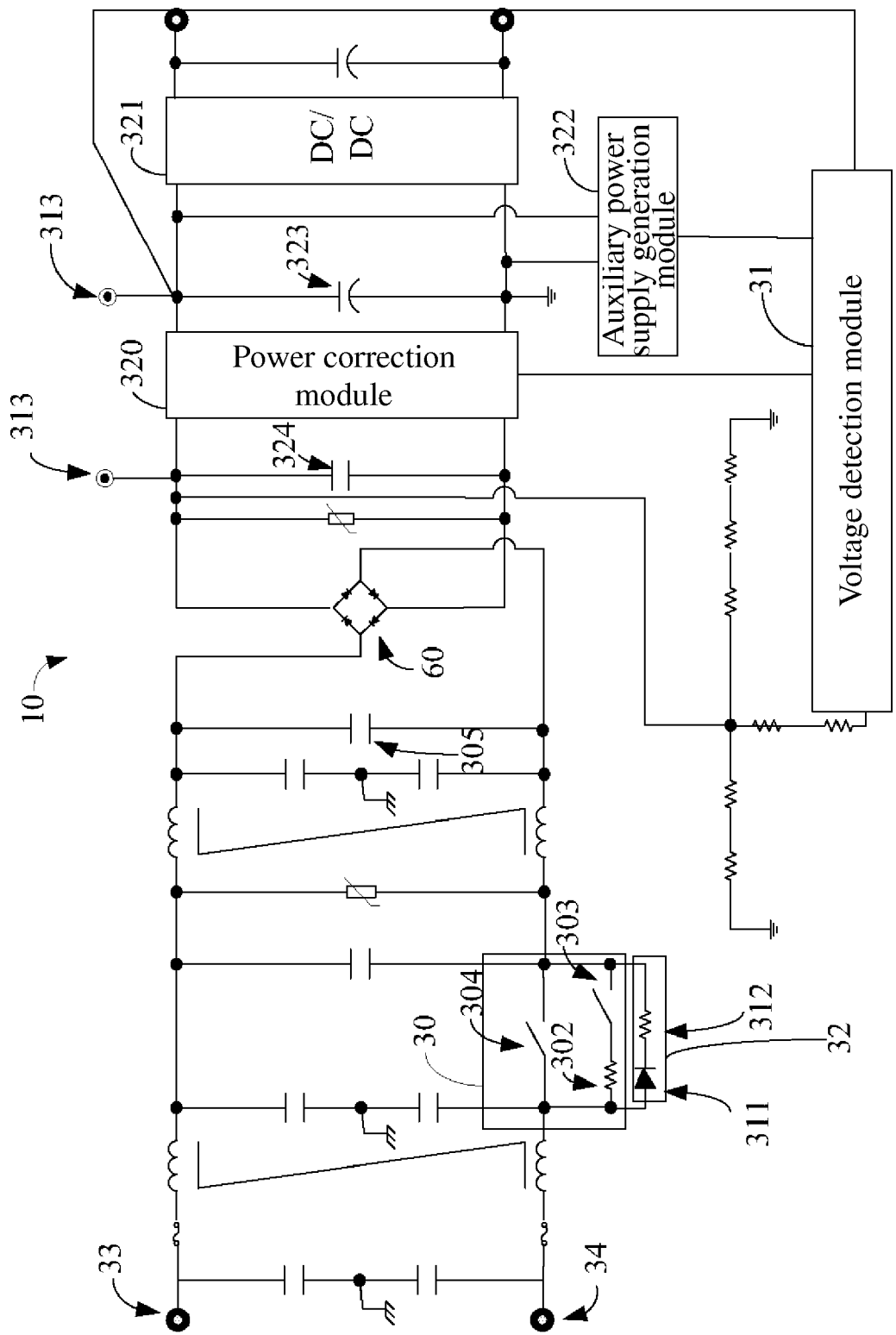
FIG. 10 is a circuit diagram of a seventh preferred embodiment of this invention.

As illustrated in FIG. 10, a seventh preferred embodiment of this invention is a protection circuit 10 for protecting a high power translation circuit. In the following description, only differences from the protection circuit 7 of the previous embodiment will be described, and the portions of the protection circuit 10 identical with those of the protection circuit 7 are omitted from description herein.

To minimize use of electronic elements in the protection circuit 10, the voltage detection module 31 in the protection circuit 10 may be coupled behind the rectification circuit 60. As compared to previous embodiments, at least the first switching device 310 and the second switching device 314 are eliminated in the protection circuit 10. As readily appreciated by those skilled in the art, this circuit layout provides the same functions as the protection circuit 7, and thus no further description will be made herein.

Figure 11:
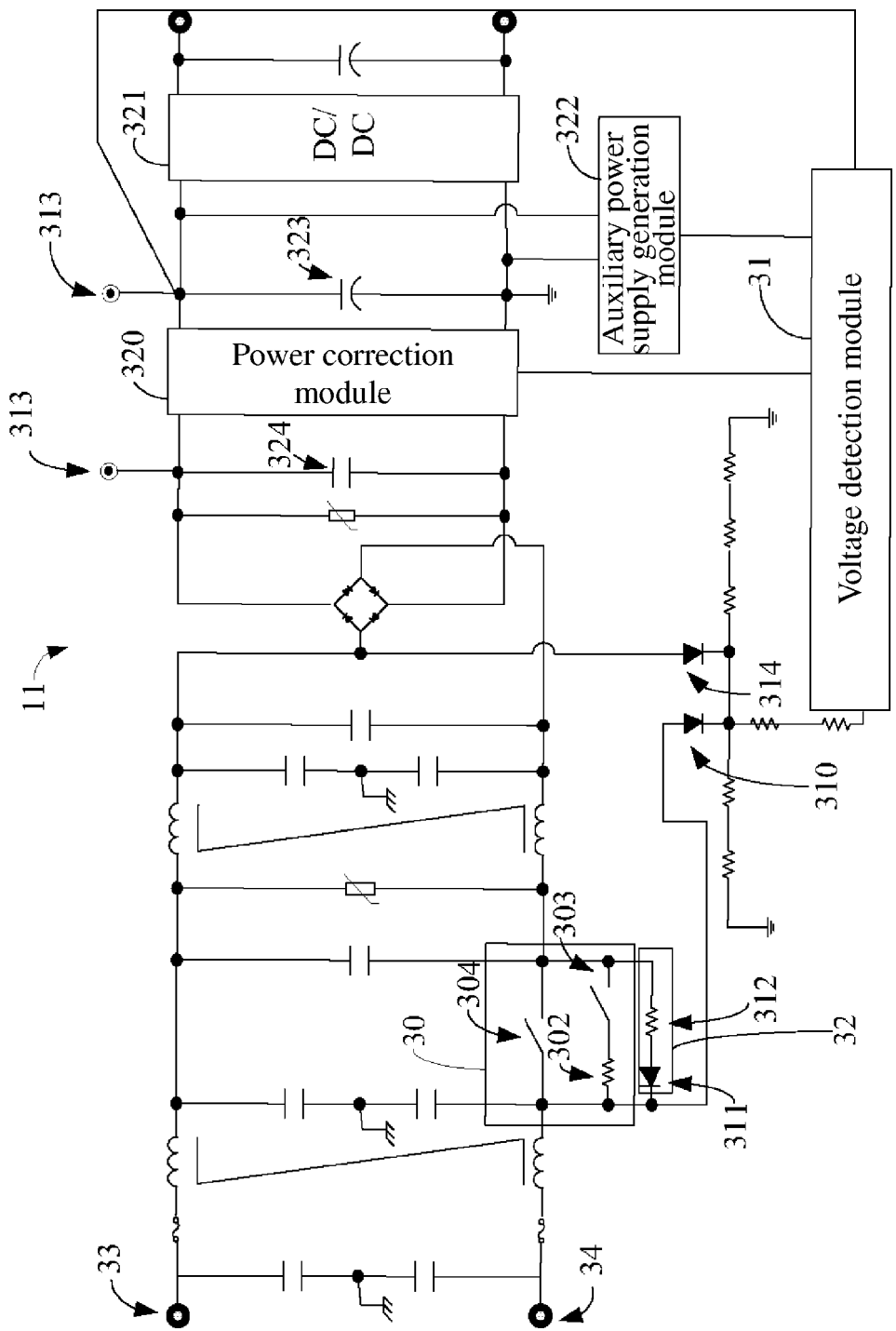
FIG. 11 is a circuit diagram of an eighth preferred embodiment of this invention.
Figure 12:
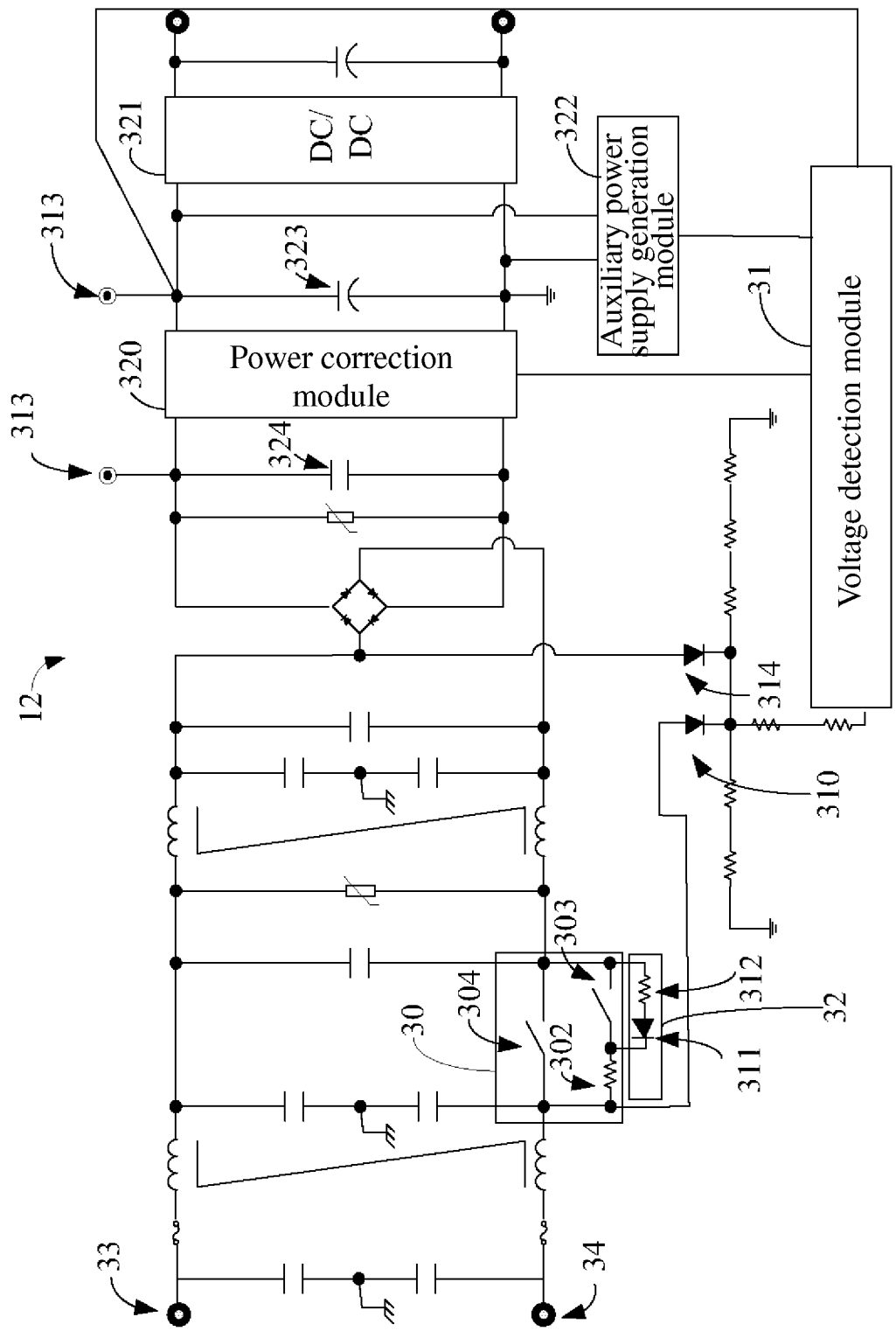
FIG. 12 is another circuit diagram of the eighth preferred embodiment of this invention.

As illustrated in FIGS. 11 and 12, an eighth preferred embodiment of this invention is protection circuits 11 and 12 for protecting a high power translation circuit. The protection circuits 11 and 12 are substantially the same as the protection circuits 7 and 8 of the previous embodiment except that the positive and negative terminals of the switching device 311 are connected to the second impedance element 312 in a way opposite to that in the protection circuits 7 and 8. As readily appreciated by those skilled in the art, this circuit layouts of the protection circuits 7 and 8 provide the same functions as the protection circuit 7 and 8, and thus no further description will be made herein.

Figure 13:
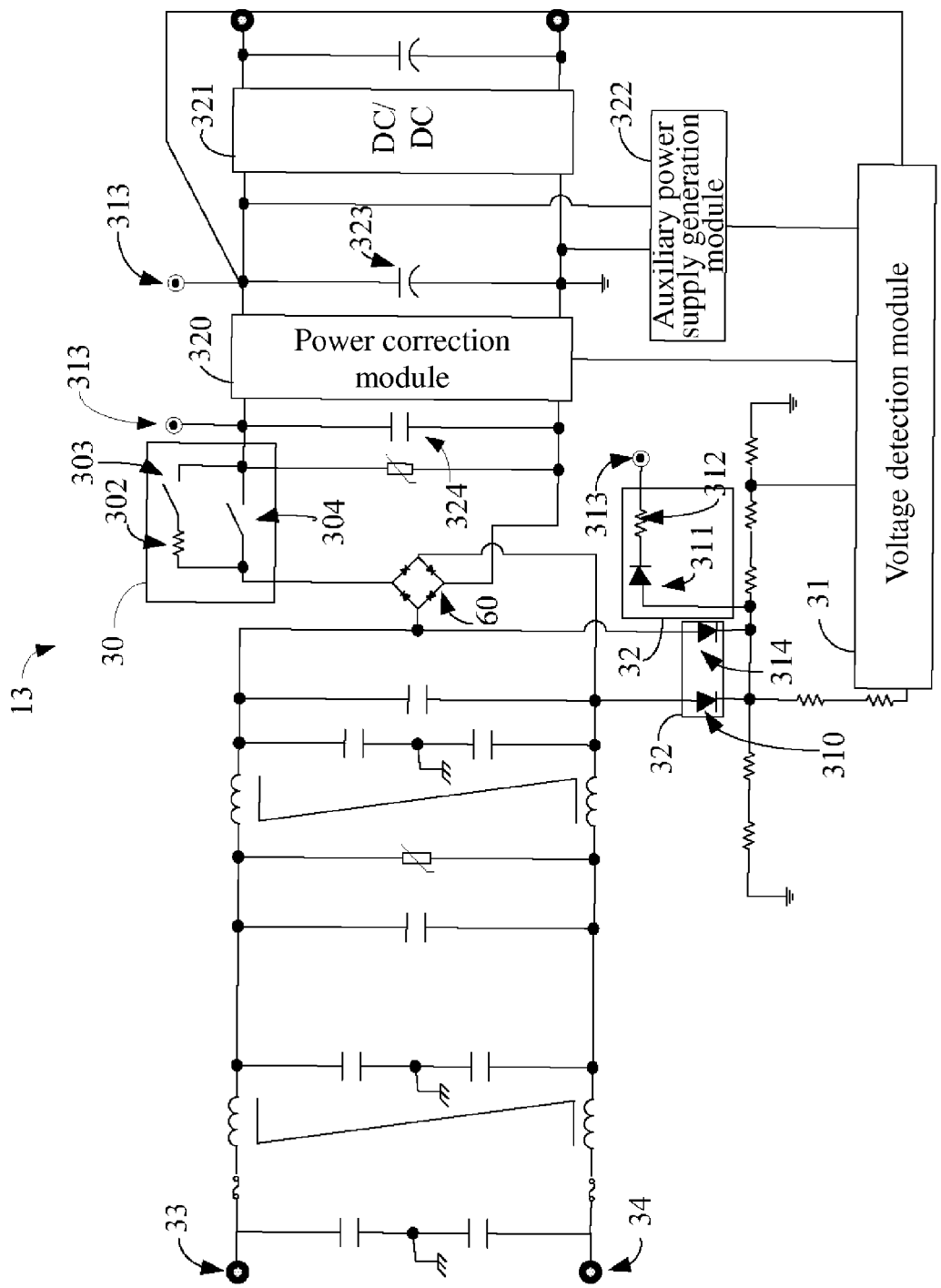
FIG. 13 is a circuit diagram of a ninth preferred embodiment of this invention.

As illustrated in FIG. 13, a ninth preferred embodiment of this invention is a protection circuit 13 for protecting a high power translation circuit. In the following description, only differences from the protection circuit 3 of the previous embodiment will be described, and the portions of the protection circuit 13 identical with those of the protection circuit 3 are omitted from description herein.

The high power translation circuit comprises a rectification circuit 60. The relay circuit 30 of the protection circuit 13 is coupled to an output terminal of the rectification circuit 60 to relay the AC input to the high power translation circuit. Additionally, the voltage detection module 31 is coupled to the high power translation circuit and receives the AC input to continuously detect a voltage value thereof. In case the voltage value is greater than or equal to a first reference value, the voltage detection module 31 generates an over-voltage signal, in response to which the relay circuit 30 is opened to cease delivering the AC input into the high power translation circuit. By means of the connections described above, a current path is established by the first switching device 310 and the second switching device 314 as well as the rectification circuit 60, in order to directly determine the AC voltage. Alternatively, a finally stabilized voltage at the voltage terminal 313 may be used to determine the AC input voltage at that time. A most prominent difference from the previous embodiments is that, an AC voltage circuit may be established by the first switching device 310, the second switching device 314 and the positive and negative half cycles of the rectification circuit 60, and the following relationship may be obtained (the turn-on voltages of the switching device 311, the first switching device 310, the second switching device 314 and the rectification circuit are ignored):

$$Po \times R1 = 2 \cdot Vbus \cdot \left[ \frac{Vm}{\pi} \sqrt{1 - \left(\frac{Vbus}{Vm}\right)^2} + Vbus \cdot \left( \frac{\arcsin\left(\frac{Vbus}{Vm}\right)}{\pi} - \frac{1}{2} \right) \right] \quad (2)$$

As readily appreciated by those skilled in the art, this circuit layout provides the same functions as the protection circuit 3, and thus no further description will be made herein.

Figure 14:
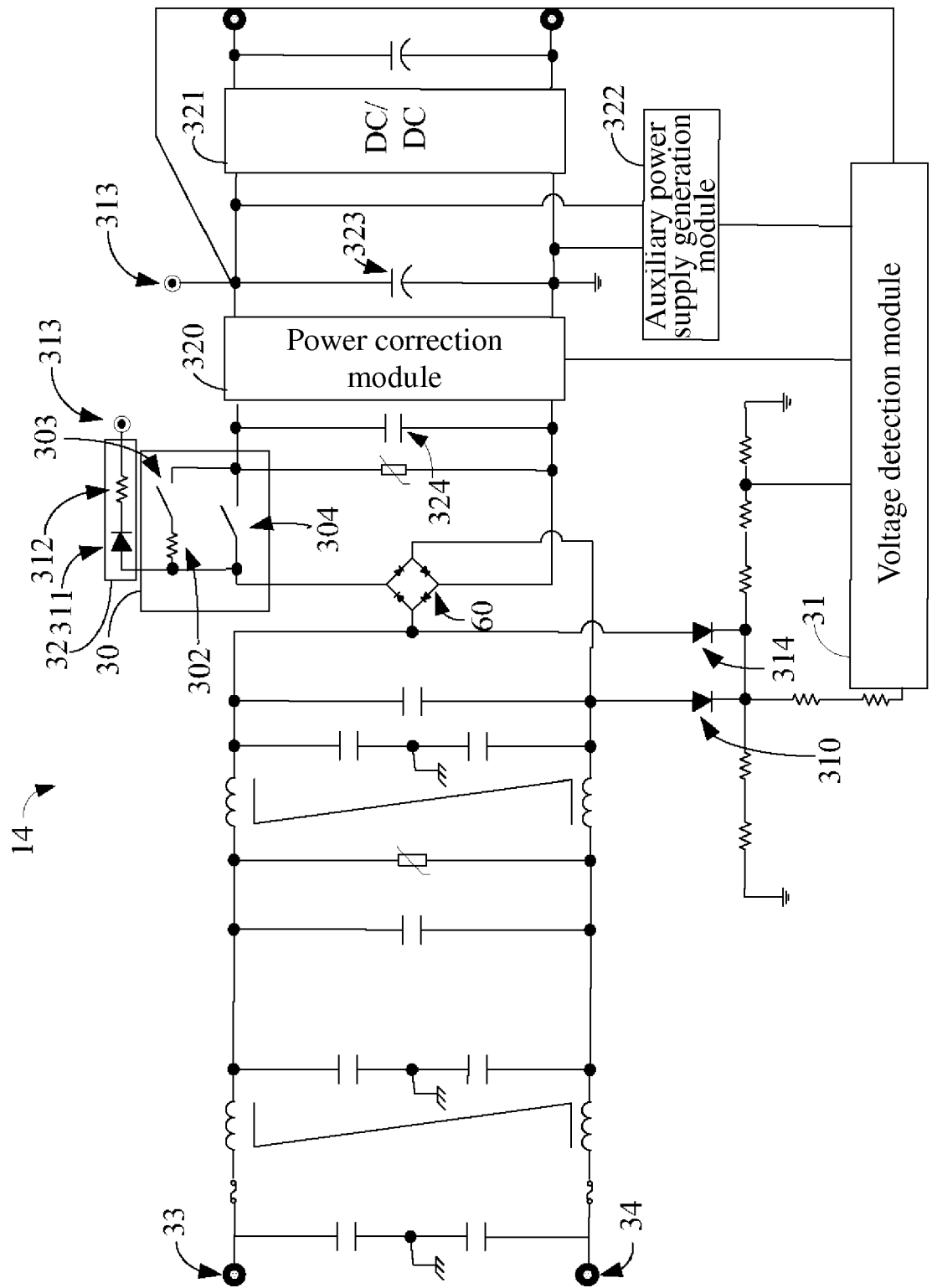
FIG. 14 is a circuit diagram of a tenth preferred embodiment of this invention.

As illustrated in FIG. 14, a tenth preferred embodiment of this invention is a protection circuit 14 for protecting a high power translation circuit. In the following description, only differences from the protection circuit 13 of the previous embodiment will be described, and the portions of the protection circuit 14 identical with those of the protection circuit 13 are omitted from description herein.

In this embodiment, the energy supply circuit 32 includes the switching device 311 and the second impedance element 312 jointly connected in series. The switching device 311 has a positive terminal coupled to the first impedance element 302 and the second switch element 304 respectively, and the second impedance element 312 has one terminal coupled to the voltage terminal 313. As readily appreciated by those skilled in the art, this circuit layout provides the same functions as the protection circuit 13, and thus no further description will be made herein.

Figure 15:
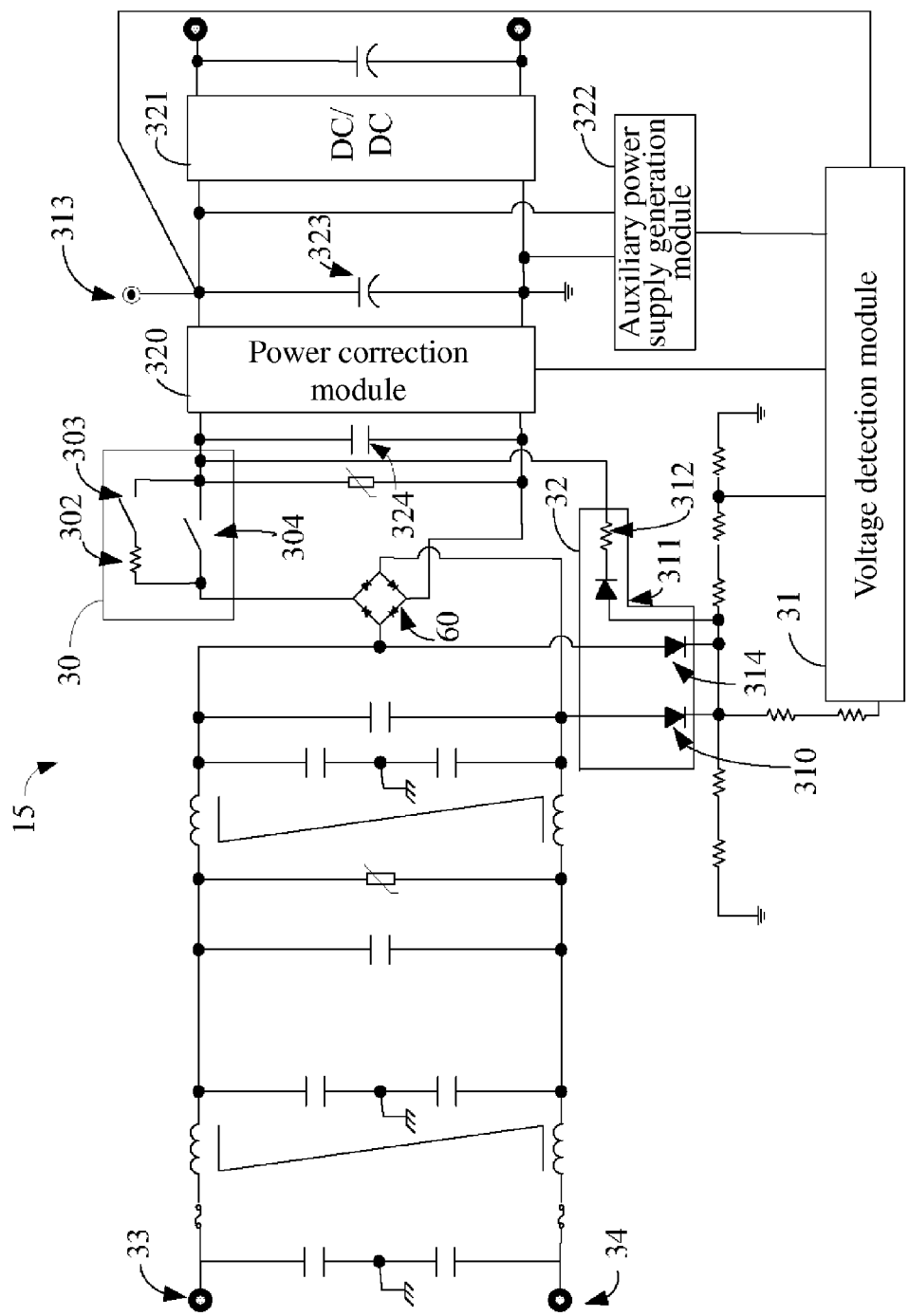
FIG. 15 is a circuit diagram of an eleventh preferred embodiment of this invention.

As illustrated in FIG. 15, an eleventh preferred embodiment of this invention is a protection circuit 15 for protecting a high power translation circuit. In the following description, only differences from the protection circuit 13 in the previous embodiment will be described, and the portions of the protection circuit 15 identical with those of the protection circuit 13 are omitted from description herein. In the protection circuit 15, the energy supply circuit 32 includes the switching device 311, 310, 314 and the second impedance element 312, where the switching device 311 and the second impedance element 312 are jointly connected in series and coupled behind the rectification circuit 60 and the relay circuit 30. As readily appreciated by those skilled in the art, this circuit layout provides the same functions as the protection circuit 13 of the previous embodiment, and thus no further description will be made herein.

Figure 16:
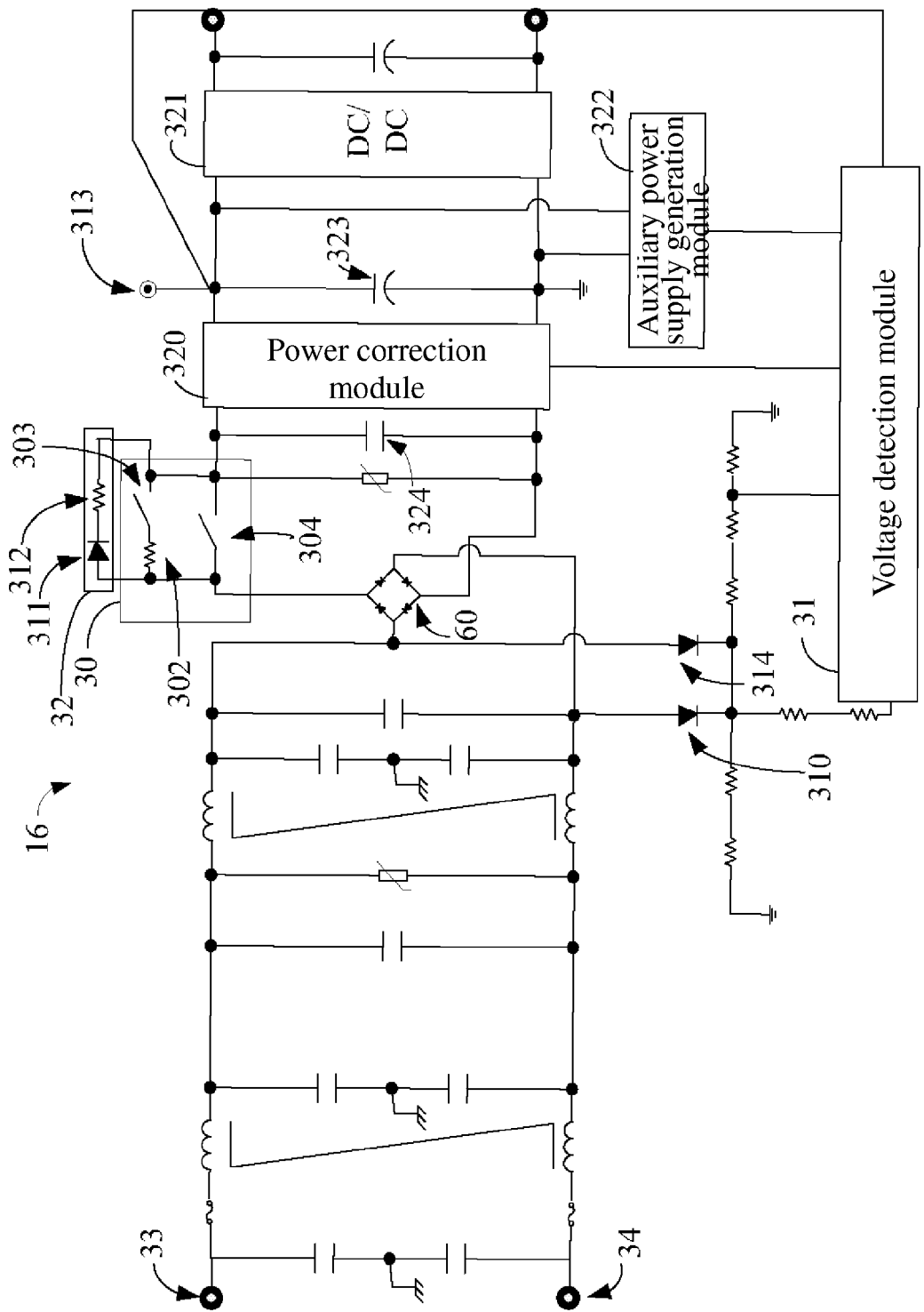
FIG. 16 is a circuit diagram of a twelfth preferred embodiment of this invention.

As illustrated in FIG. 16, a twelfth preferred embodiment of this invention is a protection circuit 16 for protecting a high power translation circuit. In the following description, only differences from the protection circuit 14 of the previous embodiment will be described, and the portions of the protection circuit 16 identical with those of the protection circuit 14 are omitted from description herein. The energy supply circuit 32 includes the switching device 311 and the second impedance element 312 jointly connected in series. The switching device 311 has a positive terminal coupled to the first impedance element 302 and the second switch element 304 respectively, and the second impedance element 312 has one terminal coupled to the first switch element 303, so that the switching device 311 and the second impedance element 312 are connected in parallel with the first impedance element 302 and the first switch element 303. As readily appreciated by those skilled in the art, this circuit layout provides the same functions as the protection circuit 14 of the previous embodiment, and thus no further description will be made herein.

Figure 17:
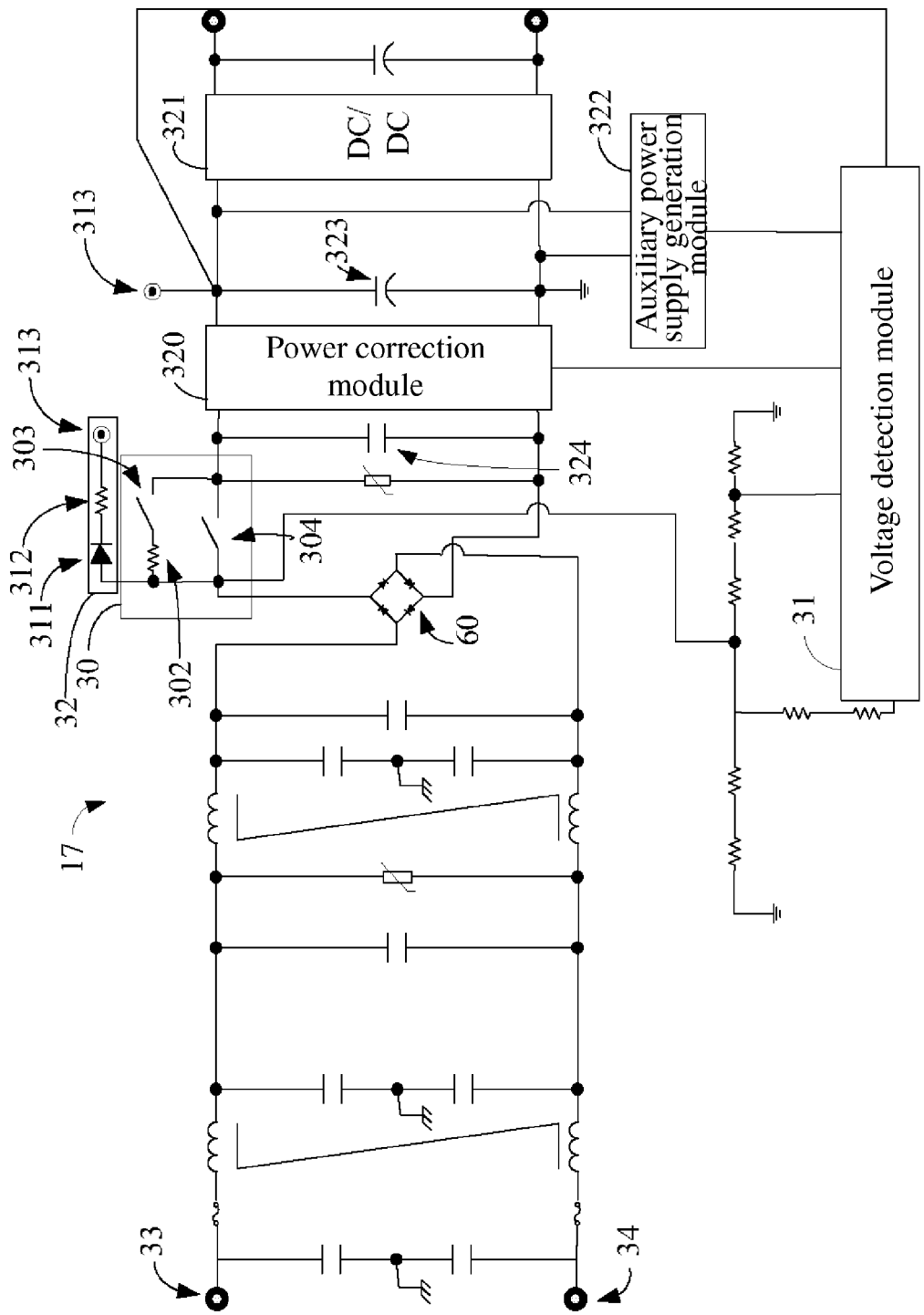
FIG. 17 is a circuit diagram of a thirteenth preferred embodiment of this invention.

As illustrated in FIG. 17, a thirteenth preferred embodiment of this invention is a protection circuit 17 for protecting a high power translation circuit. In the following description, only differences from the protection circuit 14 of the previous embodiment will be described, and the portions of the protection circuit 17 identical with those of the protection circuit 14 are omitted from description herein. To minimize use of electronic elements in the protection circuit 17, the voltage detection module 31 may be coupled between the rectification circuit 60 and the relay circuit 30, in order to determine the AC input voltage according to a voltage at a back end of the rectification circuit 60. As compared to the protection circuit 14 of the previous embodiment, at least the first switching device 310 and the second switching device 314 are eliminated in the protection circuit 17 of this embodiment. As readily appreciated by those skilled in the art, the circuit layout of this embodiment provides the same functions as the protection circuit 14 of the previous embodiment, and thus no further description will be made herein.

Figure 18:
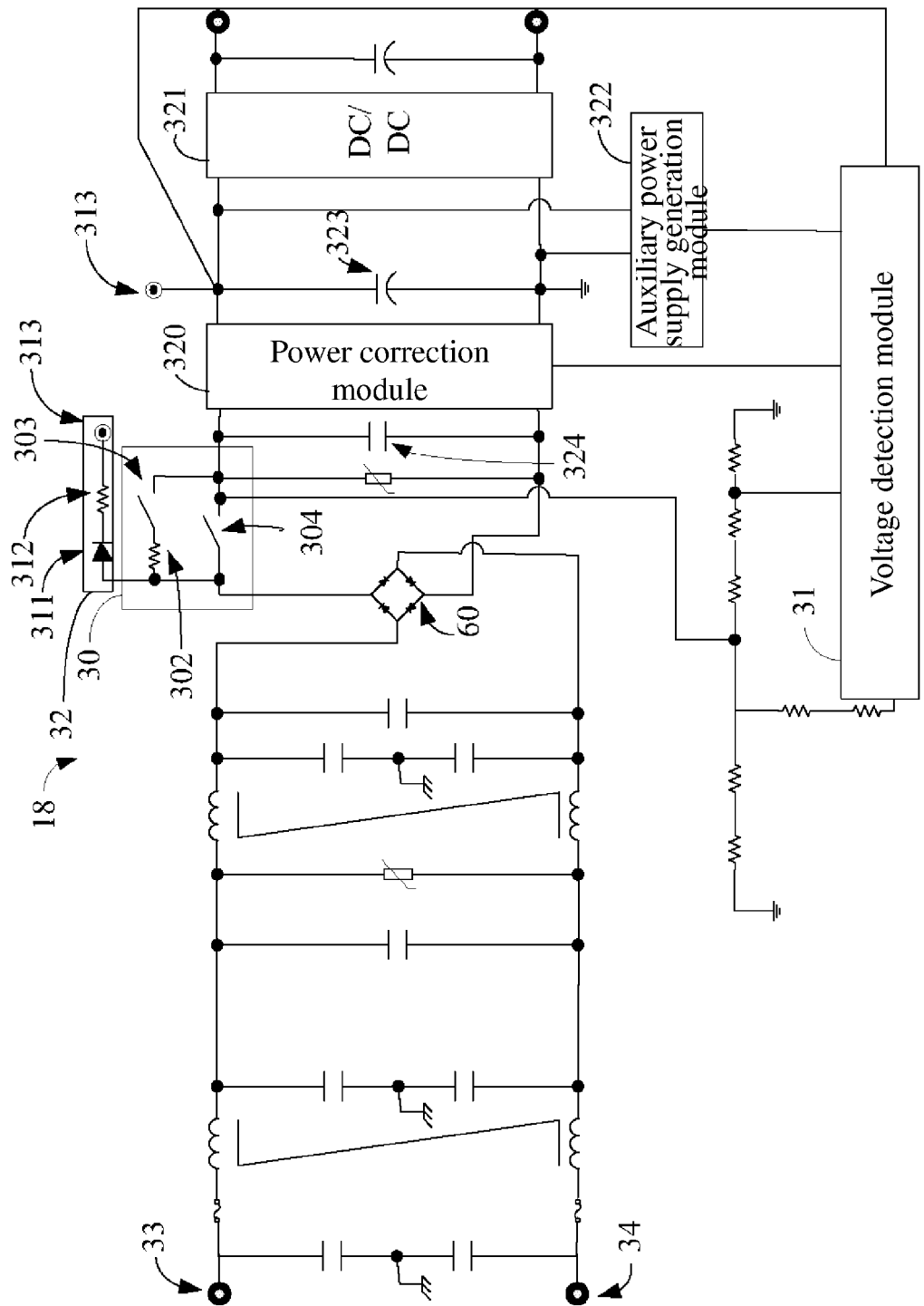
FIG. 18 is a circuit diagram of a fourteenth preferred embodiment of this invention.

As illustrated in FIG. 18, a fourteenth preferred embodiment of this invention is a protection circuit 18 for protecting a high power translation circuit. In the following description, only differences from the protection circuit 17 of the previous embodiment will be described, and the portions of the protection circuit 18 identical with those of the protection circuit 17 are omitted from description herein. In the protection circuit 18, the voltage detection module 31 is coupled to a back end of the second switch element 304, so that it may directly detect the AC input voltage when the second switch element 304 is closed. On the other hand, when the second switch element 304 is opened, the voltage detection module 31 may detect the AC input voltage from a finally stabilized voltage at the voltage terminal 313. As readily appreciated by those skilled in the art, the circuit layout of this embodiment provides the same functions as the protection circuit 14 of the previous embodiment, and thus no further description will be made herein.

Figure 19:
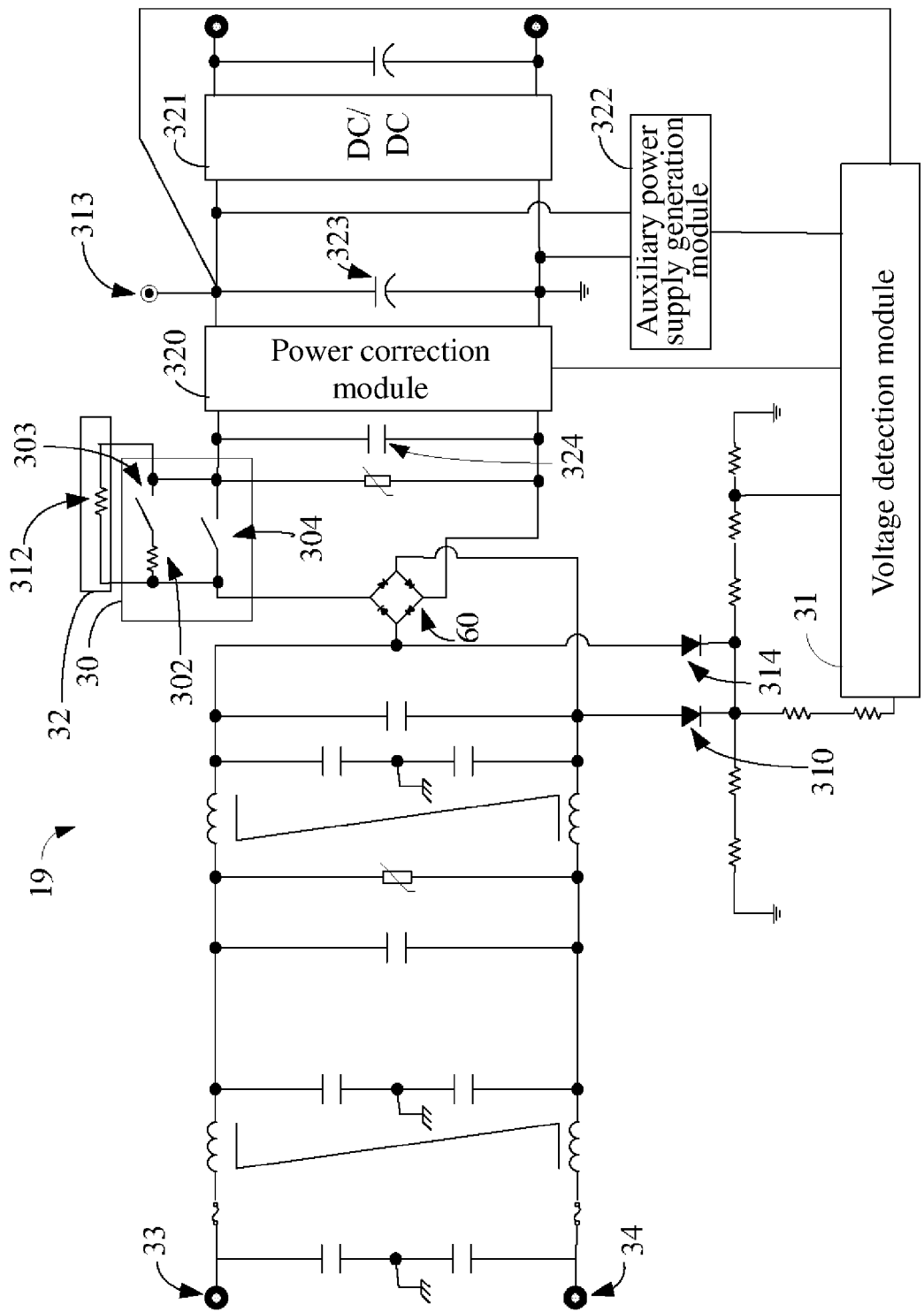
FIG. 19 is a circuit diagram of a fifteenth preferred embodiment of this invention.
Figure 20:
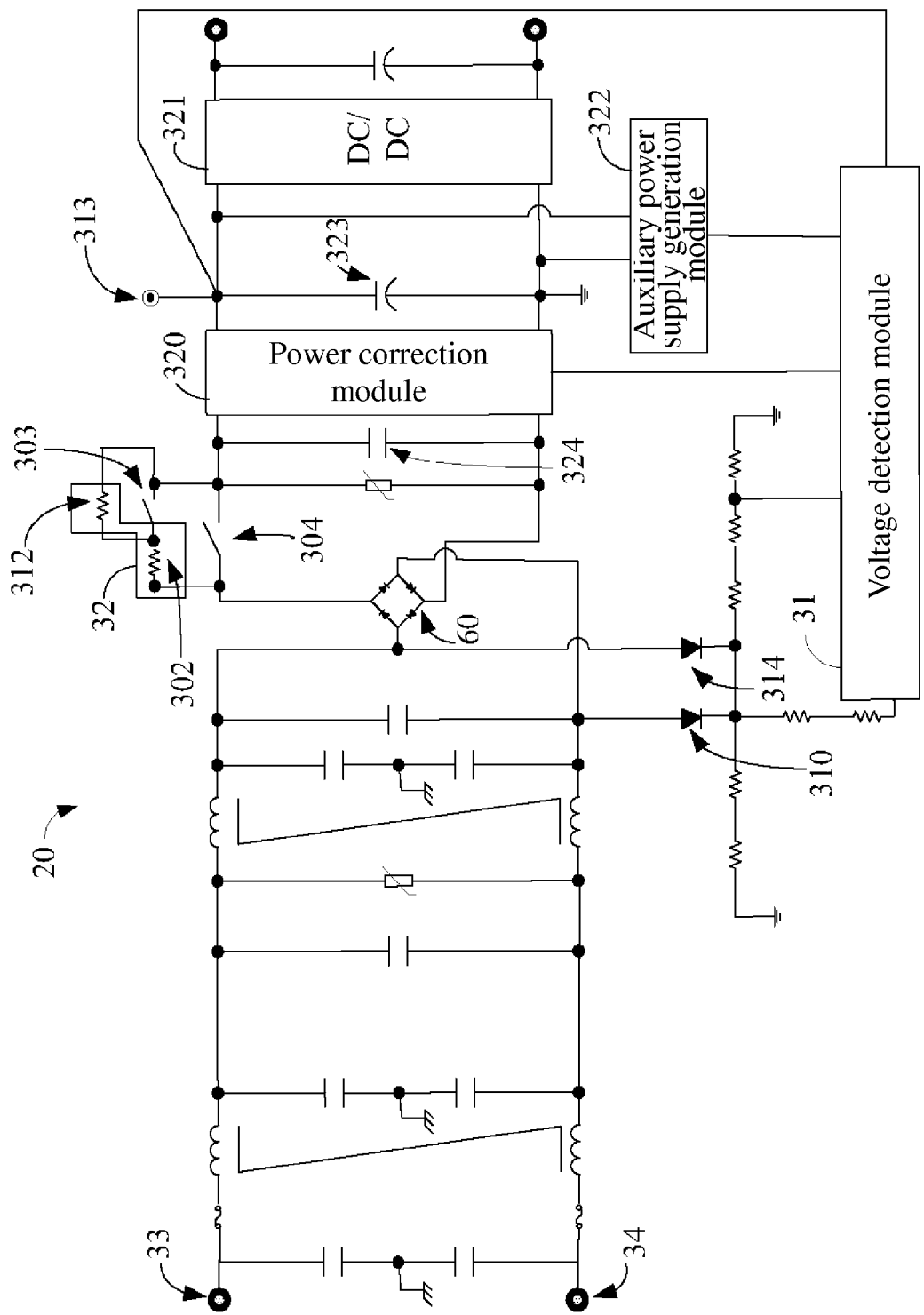
FIG. 20 is another circuit diagram of the fifteenth preferred embodiment of this invention.

As illustrated in FIG. 19, a fifteenth preferred embodiment of this invention is a protection circuit 19 for protecting a high power translation circuit. In the following description, only differences from the protection circuit 16 of the previous embodiment will be described, and the portions of the protection circuit 19 identical with those of the protection circuit 16 are omitted from description herein. The relay circuit is coupled to a back end of the rectification circuit 60, and a loop is established for the AC input by positive and negative half cycles of the rectification circuit 60. In this way, the switching device 311 is eliminated in the protection circuit 19 to save electronic elements. This protection circuit 19 provides the same functions as those of the protection circuit 16 provided that a large value is chosen for the second impedance element 312. Referring further to FIG. 20, a protection circuit 20 is illustrated therein. The protection circuit 20 may have the second impedance element 312 directly connected in parallel with the first switch element 303, and provides the same functions as those of the protection circuit 19. The protection circuits 19 and 20 will be readily appreciated by those skilled in the art, and thus no further description will be made herein.

Figure 21:
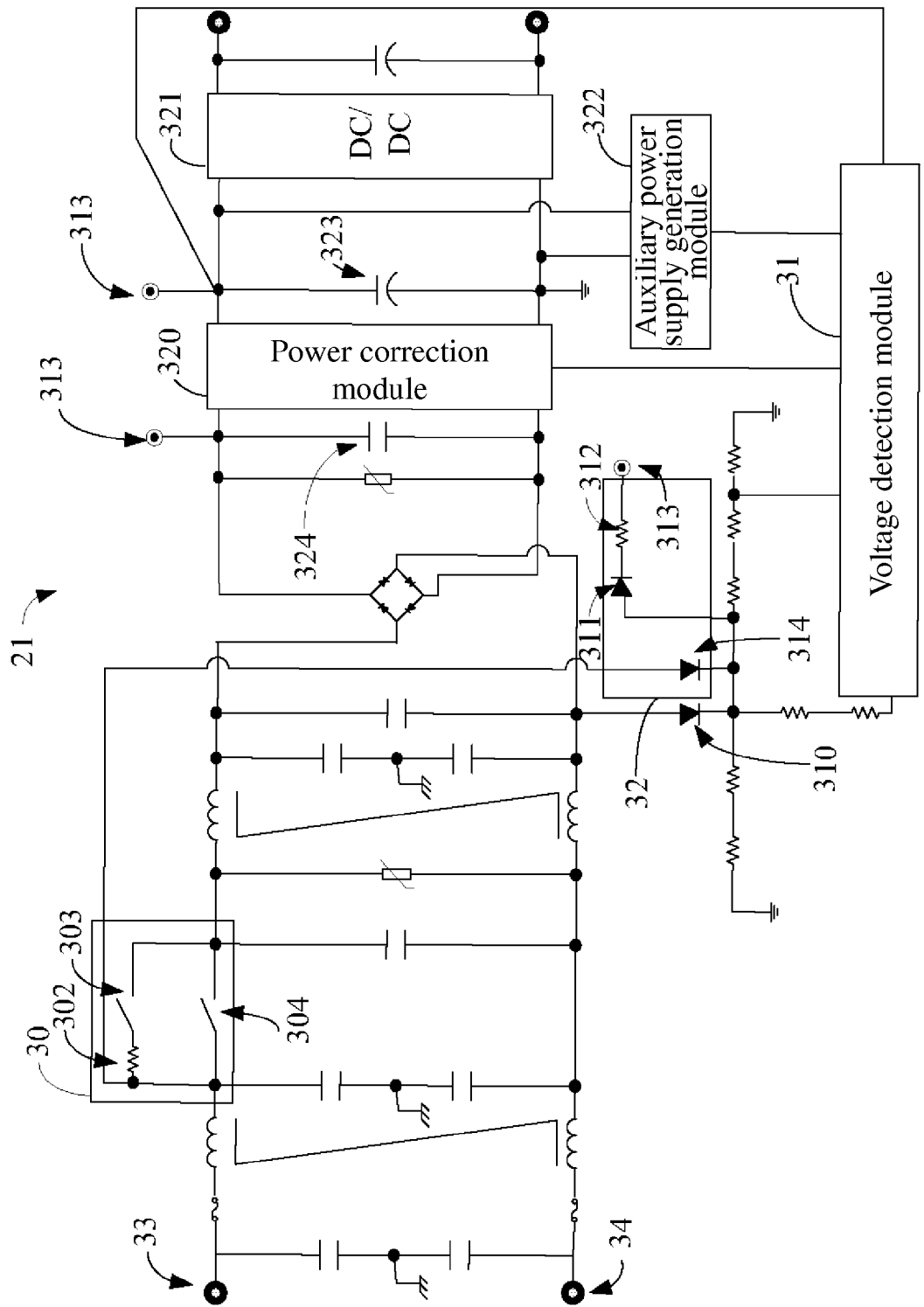
FIG. 21 is a circuit diagram of a sixteenth preferred embodiment of this invention.

As illustrated in FIG. 21, a sixteenth preferred embodiment of this invention is a protection circuit 21 for protecting a high power translation circuit. In the following description, only differences from the protection circuit 3 of the previous embodiment will be described, ant the portions of the protection circuit 21 identical with those of the protection circuit 3 are omitted from description herein. The protection circuit 21 may have the relay circuit 30 disposed at a neutral terminal of the AC input, and still provides the same functions as those of the protection circuit 3 of the previous embodiment. Alternatively, the relay circuit 30 may be disposed at a line terminal of the AC input, which will be readily appreciated by those skilled in the art, and thus no further description will be made herein.

Figure 22:
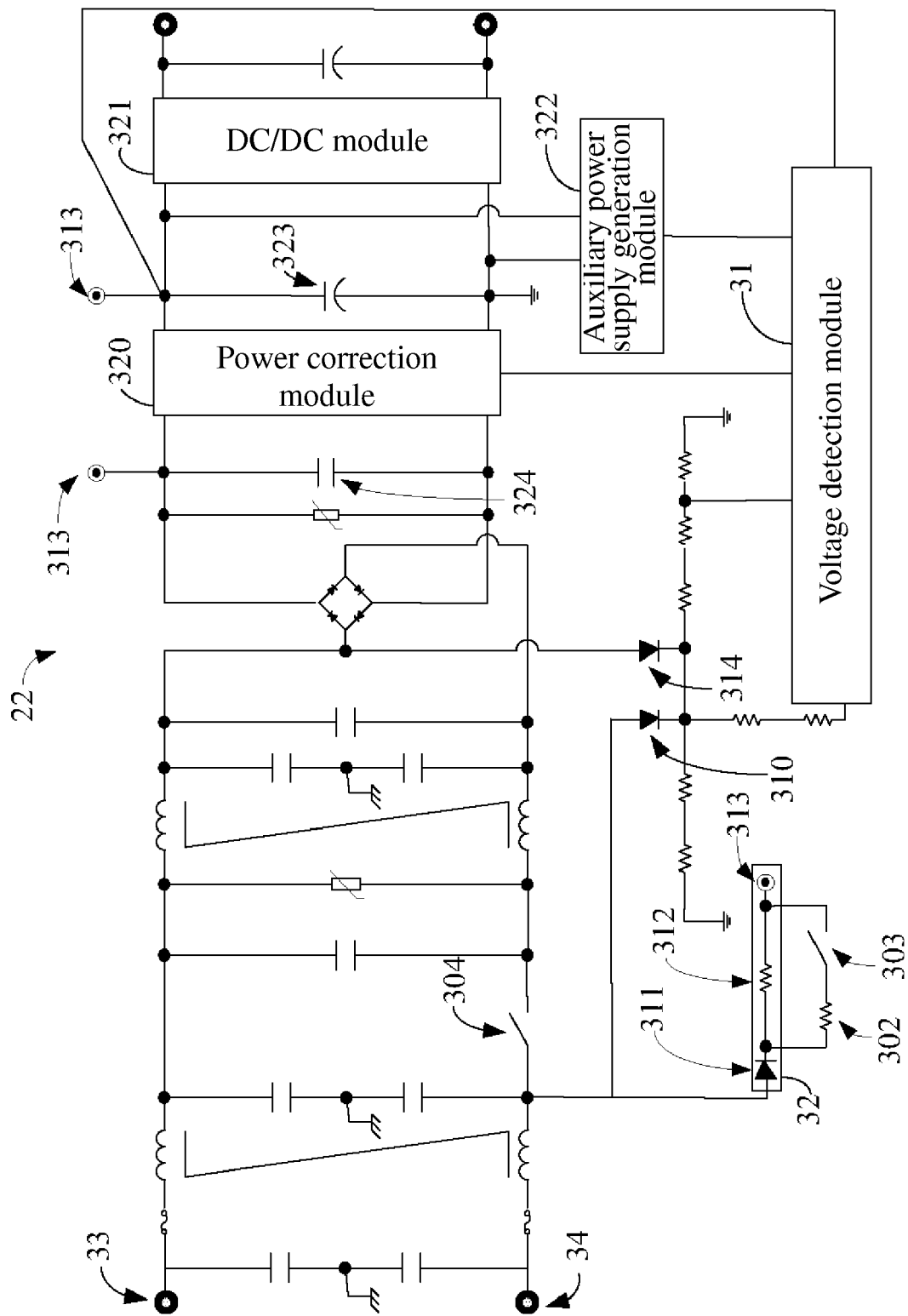
FIG. 22 is a circuit diagram of a seventeenth preferred embodiment of this invention.
Figure 23:
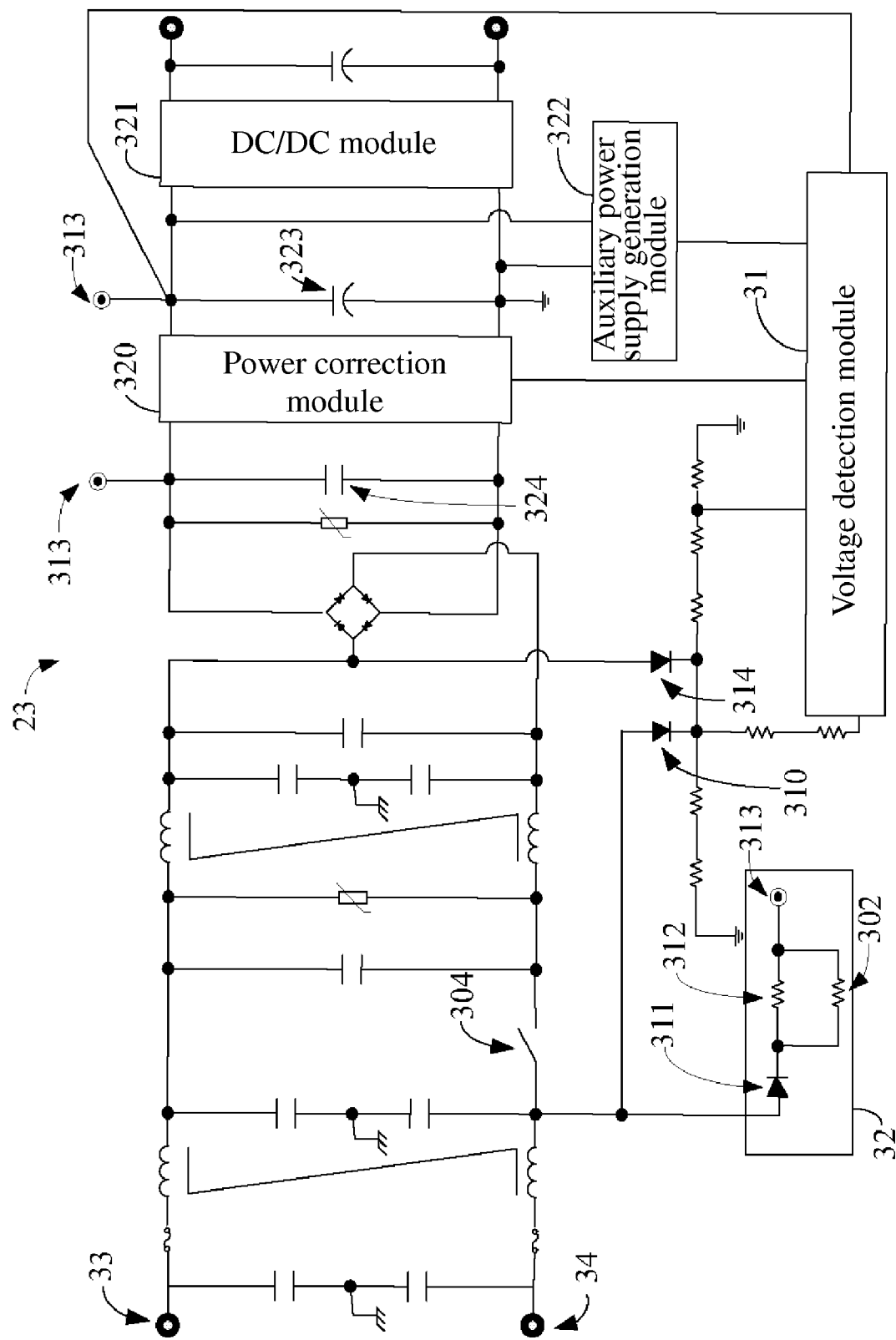
FIG. 23 is another circuit diagram of the seventeenth preferred embodiment of this invention.

As illustrated in FIGS. 22 and 23, a seventeenth preferred embodiment of this invention is protection circuits 22 and 23 for protecting a high power translation circuit. In the following description, only differences from the protection circuit 4 of the previous embodiment will be described, and the portions of the protection circuits 22 and 23 identical with those of the protection circuit 4 are omitted from description herein. In the protection circuit 22, the first impedance element 302 and the first switch element 303 are connected in series with each other, and are then connected in parallel with the second impedance element 312. Referring next to FIG. 23, when the first impedance element 302 in the protection circuit 23 is a positive temperature coefficient element, the first switch element 303 can be eliminated. Once the voltage detection module detects an over-voltage condition in the AC input, the switch element 304 is opened, where the capacitor 323 is charged through the energy supply circuit 32. The energy supply circuit 32 comprises the switching device 311 and the impedance elements 312, 302. Since the first impedance element 302 is a positive temperature coefficient element, heat generated therein when the charging current flows through the switching device 311 and the first impedance element 302 will drive the impedance of the first impedance element 302 to increase. In this case, the second impedance element 312 also makes a contribution in charging the capacitor 323, and this continues until the impedance of the first impedance element 302 grows significantly higher than that of the second impedance element 312, after which the capacitor 323 will be charged by the switching device 311 and the second impedance element 312 instead. This protection circuit 23 provides the same functions as those of the protection circuit 4 of the previous embodiment. In addition, when the first impedance element 302 shown in FIGS. 3, 7, 9-11, 13-19 and 21, is a positive temperature coefficient element, the first switch element 303 may be eliminated while the aforesaid goal can still be accomplished. Characteristics of a positive temperature coefficient will be readily appreciated by those skilled in the art, and thus no further description will be made herein.

Figure 24:
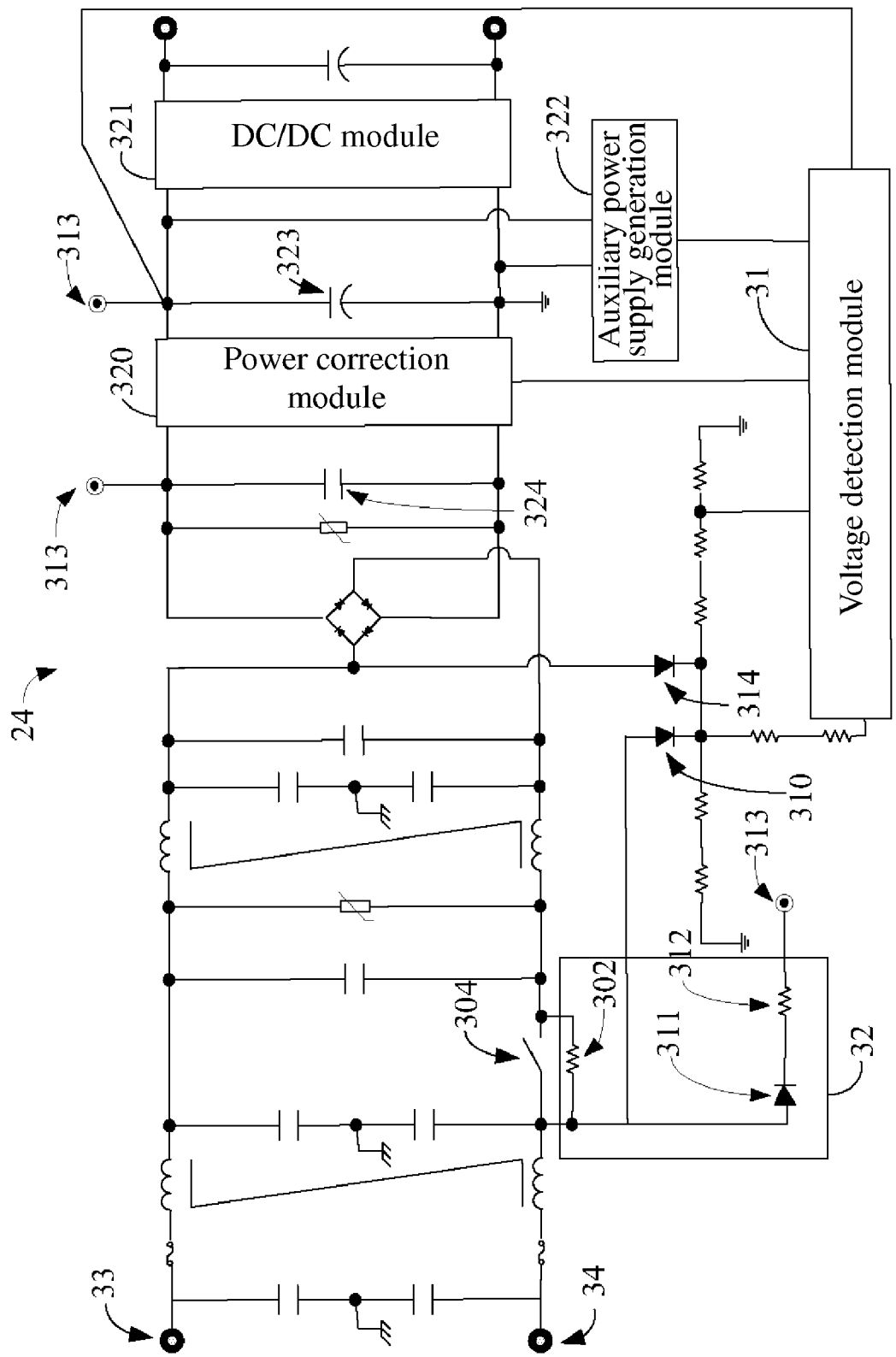
FIG. 24 is a circuit diagram of an eighteenth preferred embodiment of this invention.

As illustrated in FIG. 24, an eighteenth preferred embodiment of this invention is a protection circuit 24 for protecting a high power translation circuit. In the following description, only differences from the protection circuit 23 of the previous embodiment will be described, and the portions of the protection circuit 24 identical with those of the protection circuit 23 are omitted from description herein. In the protection circuit 24, the first impedance element 302 has a positive temperature coefficient element and is connected in parallel with the switch element 304. As readily appreciated by those skilled in the art, this protection circuit provides the same functions as the protection circuit 23 of the previous embodiment, and thus no further description will be made herein.

Figure 25:
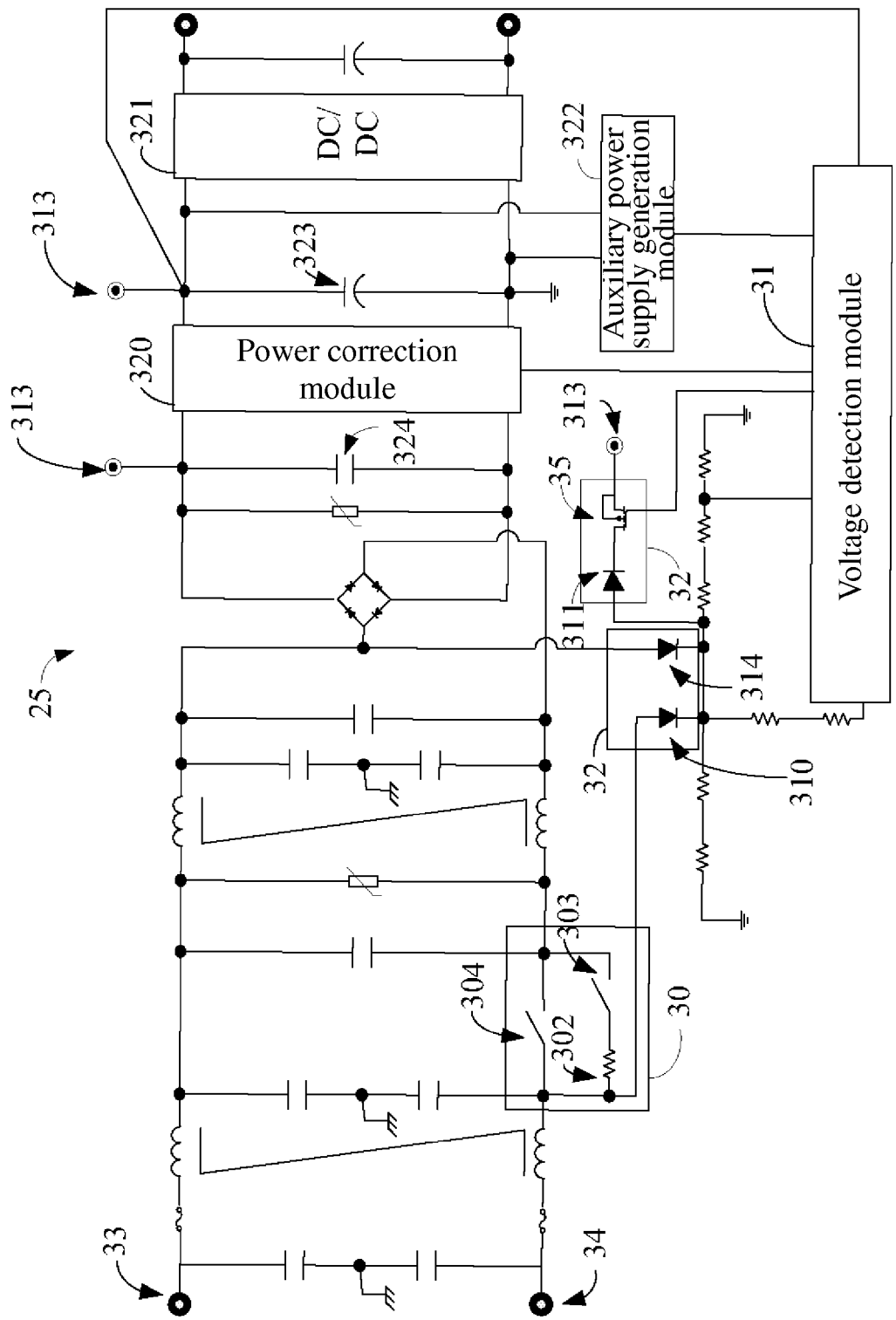
FIG. 25 is a circuit diagram of a nineteenth preferred embodiment of this invention.

It should be noted that, the second impedance element 312 in each of the aforesaid embodiments may be replaced by an active element. Taking the protection circuit 3 as an example, if the second impedance element 312 is replaced by a Metal-Oxide-Semiconductor Field-Effect Transistor (MOSFET) 35, a protection circuit 25 in accordance with a nineteenth embodiment of this invention will be obtained as shown in FIG. 25. This also applies to the protection circuits in other embodiments, and no further description will be made herein.

Figure 26A:
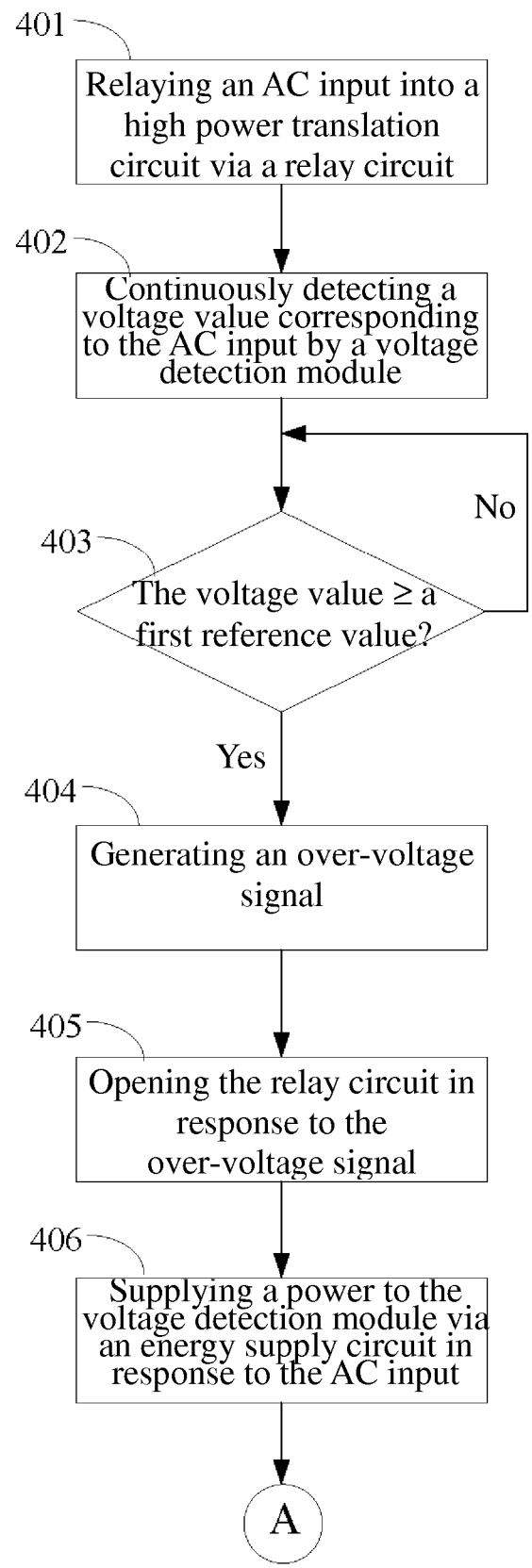
FIG. 26A is a partial flow chart of a twentieth preferred embodiment of this invention.
Figure 26B:
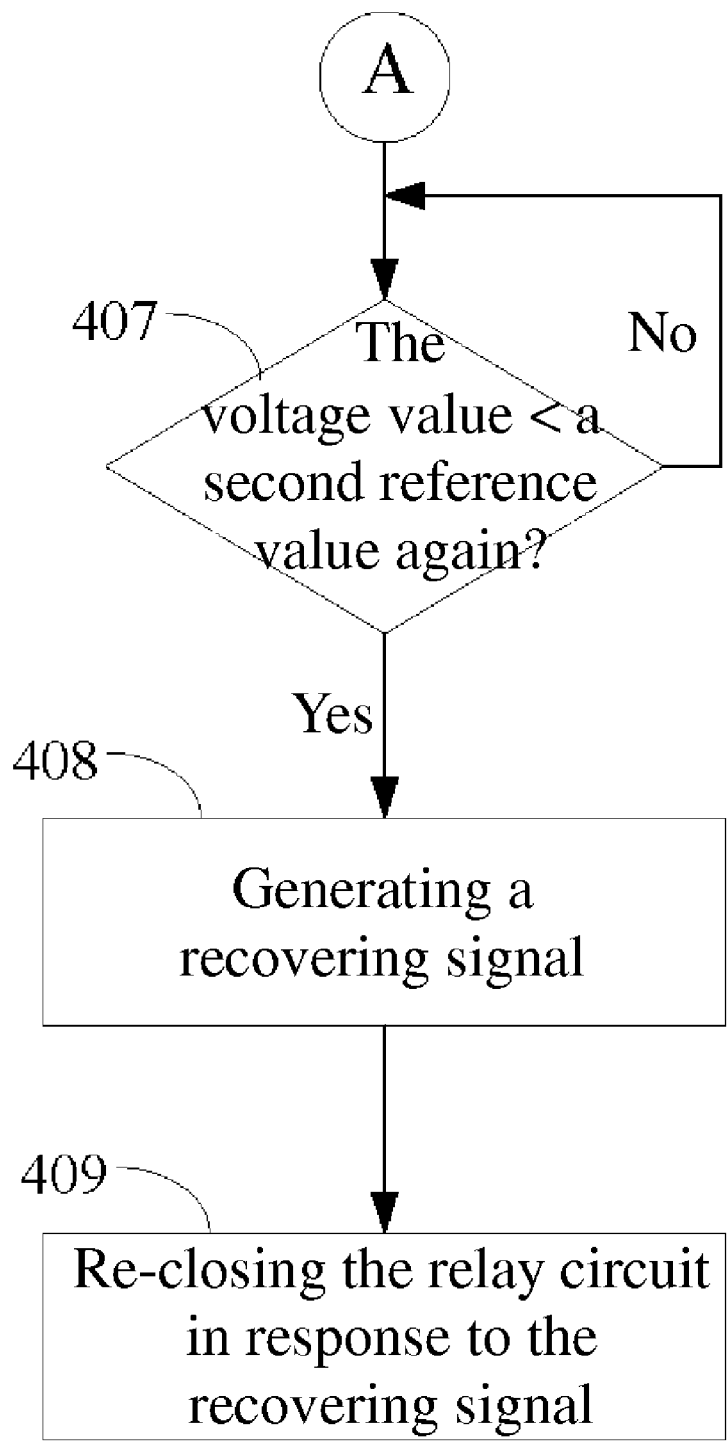
FIG. 26B is a partial flow chart of the twentieth preferred embodiment of this invention.

A twentieth preferred embodiment of this invention is illustrated in FIGS. 26A and 26B, which illustrates a flow chart of an over-voltage protection method applied in an over-voltage protection circuit structure to protect a high power translation circuit. The over-voltage protection circuit structure comprises a relay circuit, a voltage detection module and an energy supply circuit. Initially in step 401, an AC input is relayed into the high power translation circuit via the relay circuit. In step 402, a voltage value corresponding to the AC input is continuously detected by a voltage detection module. In step 403, it is determined whether the voltage value of the AC input is greater than or equal to a first reference value. If not, the determination step continues repeatedly. Otherwise, if so, an over-voltage signal is generated in step 404.

Next in step 405, in response to the over-voltage signal, the relay circuit is opened to cease delivering the AC input into the high power translation circuit. In step 406, in response to the AC input, a power is supplied to the voltage detection module via the energy supply circuit to maintain normal operation of the voltage detection module. In step 407, it is determined by the voltage detection module whether the voltage value of the AC input is smaller than a second reference value. If not, the determination step continues repeatedly. If so, a recovering signal is generated from the voltage detection module in step 408. Finally in step 409, the relay circuit is re-closed in response to the recovery signal to relay the AC input into the high power translation circuit.

In addition to the steps illustrated in FIGS. 26A and 26B, the twentieth embodiment may also execute all the operations and functions described in all the aforesaid embodiments. Corresponding operations and functions in the twentieth embodiment will readily occur to those of ordinary skill in the art upon reviewing description of the aforesaid embodiments, and therefore no further description will be made herein.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An over-voltage protection circuit structure for protecting a high power translation circuit comprising a rectification circuit, the over-voltage protection circuit structure being electrically connected to a alternating current input terminal to receive an alternating current input and comprising:
   a relay circuit, being coupled to the rectification circuit of the high power translation circuit and the alternating current input terminal, and configured to relay the alternating current input to the rectification circuit of the high power translation circuit;
   a voltage detection module, being coupled to the relay circuit and configured to continuously detect a voltage value corresponding to the alternating current input, being configured to generate an over-voltage signal when the voltage value is greater than or equal to a first reference value, the relay circuit being configured to open to cease delivering the alternating current input into the high power translation circuit in response to the over-voltage signal; and
   an energy supply circuit, being coupled to the relay circuit and the voltage detection module, being configured to provide a power to an auxiliary supply generation module in response to the alternating current input to power the voltage detection module, so that the voltage detection module operates normally;
   wherein a bulk capacitor is charged via the energy supply circuit to stabilize the bulk capacitor at a safe voltage value when the relay circuit is opened, and the bulk capacitor may supply the energy to the auxiliary power supply generation module.

2. The over-voltage protection circuit structure as claimed in claim 1, wherein the voltage detection module is configured to continuously detect the voltage value corresponding to the alternating current input when the relay circuit opens, and to generate a recovering signal when the voltage value is smaller than a second reference value, the relay circuit closes in response to the recovering signal so that the relay circuit relays the alternating current input into the high power translation circuit again.

3. The over-voltage protection circuit structure as claimed in claim 1, wherein the relay circuit comprises:
   a first switch element;
   a second switch element; and
   a first impedance element;
   wherein the first switch element and the first impedance element are jointly connected in series, the second switch element is connected to the first switch element and the first impedance element respectively, so as to be connected in parallel with the series connection formed by the first switch element and the first impedance element, the second switch element and the first impedance element are coupled to the voltage detection module, the first switch element and the second switch element open in response to the over-voltage signal respectively to cease delivering the alternating current input into the high power translation circuit.

4. The over-voltage protection circuit structure as claimed in claim 1, wherein the high power translation circuit further comprises a capacitive impedance, the rectification circuit is connected to the alternating current input terminal through the relay circuit, the capacitive impedance is connected to an output terminal of the rectification circuit.

5. The over-voltage protection circuit structure as claimed in claim 4, wherein the voltage detection module is connected to a juncture of the alternating current input terminal and the relay circuit through a switch element.

6. The over-voltage protection circuit structure as claimed in claim 4, wherein the voltage detection module is connected to a juncture of the rectification circuit and the relay circuit through a switch element.

7. The over-voltage protection circuit structure as claimed in claim 5, wherein the switch element is a diode.

8. The over-voltage protection circuit structure as claimed in claim 6, wherein the switch element is a diode.

9. The over-voltage protection circuit structure as claimed in claim 1, wherein the high power translation circuit further comprises the rectification circuit, the relay circuit is further coupled to an output terminal of the rectification circuit, so as to receive the alternating current input through the rectification circuit and relay the alternating current input into the high power translation circuit.

10. The over-voltage protection circuit structure as claimed in claim 9, wherein the voltage detection module is connected to a juncture of the rectification circuit and the relay circuit through a switch element.

11. The over-voltage protection circuit structure as claimed in claim 9, wherein the voltage detection module is connected to a juncture of the rectification circuit and the alternating current input terminal through a switch element.

12. The over-voltage protection circuit structure as claimed in claim 10, wherein the switch element is a diode.

13. The over-voltage protection circuit structure as claimed in claim 11, wherein the switch element is a diode.

14. The over-voltage protection circuit structure as claimed in claim 1, wherein the relay circuit receives the alternating current input, and the energy supply circuit is connected to a juncture of the alternating current input terminal and the relay circuit.

15. The over-voltage protection circuit structure as claimed in claim 14, wherein the relay circuit is connected to the energy supply circuit.

16. The over-voltage protection circuit structure as claimed in claim 14, wherein the high power translation circuit further comprises the rectification circuit connected to the alternating current input terminal through the relay circuit, and the energy supply circuit is connected to a juncture of the relay circuit and the rectification circuit.

17. The over-voltage protection circuit structure as claimed in claim 14, wherein the high power translation circuit further comprises the rectification circuit and a capacitive impedance, the rectification circuit is connected to a alternating current input terminal through the relay circuit, the capacitive impedance is connected to an output terminal of the rectification circuit, and the energy supply circuit is connected to a juncture of the capacitive impedance and the rectification circuit.

18. The over-voltage protection circuit structure as claimed in claim 14, wherein the high power translation circuit further comprises the rectification circuit and a capacitive impedance, the relay circuit is further coupled to a juncture of the rectification circuit and the capacitive impedance, and the energy supply circuit is connected to the relay circuit.

19. The over-voltage protection circuit structure as claimed in claim 14, wherein the high power translation circuit further comprises the rectification circuit and a capacitive impedance, the relay circuit is further coupled to a juncture of the rectification circuit and the capacitive impedance, and the energy supply circuit is connected to the capacitive impedance.

20. The over-voltage protection circuit structure as claimed in claim 14, wherein the high power translation circuit further comprises the rectification circuit and a capacitive impedance, the relay circuit is further coupled to a juncture of the rectification circuit and the capacitive impedance, and the energy supply circuit is connected to a juncture of the capacitive impedance and the relay circuit.

21. The over-voltage protection circuit structure as claimed in claim 14, wherein the energy supply circuit comprises a switching device.

22. The over-voltage protection circuit structure as claimed in claim 21, wherein the energy supply circuit further comprises an impedance element connected to the switching device in series.

23. The over-voltage protection circuit structure as claimed in claim 21, wherein the switching device is a diode.

24. The over-voltage protection circuit structure as claimed in claim 21, wherein the switching device is a Metal-Oxide-Semiconductor Field-Effect Transistor.

25. The over-voltage protection circuit structure as claimed in claim 1, wherein when the relay circuit opens, the energy supply circuit is further configured to provide a power to the voltage detection module in response to the alternating current input so that the voltage detection module operates normally.

* * * * *